(12) United States Patent
Boyd et al.

(10) Patent No.: US 11,348,093 B2
(45) Date of Patent: *May 31, 2022

(54) SYSTEM AND METHOD FOR MERCHANT AND PERSONAL TRANSACTIONS USING MOBILE IDENTIFICATION CREDENTIAL

(71) Applicant: The Government of the United States of America, as represented by the Secretary of Homeland Security, Washington, DC (US)

(72) Inventors: Daniel A. Boyd, Arlington, VA (US); Kelli L. Biegger, McLean, VA (US); Chang Ellison, Arlington, VA (US); Brandon P. Gutierrez, Burke, VA (US); Jason Lim, Alexandria, VA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,016

(22) Filed: Oct. 21, 2021

(65) Prior Publication Data
US 2022/0044227 A1 Feb. 10, 2022

Related U.S. Application Data

(63) Continuation of application No. 17/205,856, filed on Mar. 18, 2021, now Pat. No. 11,182,774.
(Continued)

(51) Int. Cl.
*G06Q 20/34* (2012.01)
*G06Q 20/32* (2012.01)
*G06Q 20/36* (2012.01)

(52) U.S. Cl.
CPC ......... *G06Q 20/347* (2013.01); *G06Q 20/326* (2020.05); *G06Q 20/3224* (2013.01); *G06Q 20/3226* (2013.01); *G06Q 20/3674* (2013.01)

(58) Field of Classification Search
CPC .......... G06K 9/00; G06Q 20/20; G06Q 20/40; G06Q 20/3821; G06Q 20/0855
(Continued)

(56) References Cited

U.S. PATENT DOCUMENTS 7,849,501 B2  12/2010  Vishik et al.
8,353,016 B1  1/2013  Pravetz et al.
(Continued)

OTHER PUBLICATIONS

Carnley, P. Renee, et al., "Trusted Digital Identities for Mobile Devices", 2020 IEEE Intl Conf on Dependable, Autonomic and Secure Computing, Intl Conf on Pervasive Intelligence and Computing,Intl Conf on Cloud and Big Data Computing, Intl Conf on Cyber Science and Technology Congress, (DASC/PiCom/CBDCom/CyberSciTech) (pp. 483-490), Aug. 1, 2020.

*Primary Examiner* — Edwyn Labaze
(74) *Attorney, Agent, or Firm* — Lavanya Ratnam; Robert W. Busby; William Washington

(57) ABSTRACT

In an example involving a transaction conducted between a first party using a user mobile-identification-credential device (UMD) and a second party using a relying party system (RPS), RPS receives a request from UMD for transfer of an item, requests identification information of the first party from UMD, receives, based on consent of the first party, some or all user ID information associated with a mobile identification credential (MIC) which UMD received from an authorizing party system (APS), receives verification of the received user ID information, uses the verified user ID information to verify or not verify an identity of the first party, grants the request to transfer the item in exchange for payment or another item to be transferred from the first
(Continued)

party to the second party when the identity of the first party is verified, and denies the request when the identity of the first party is not verified.

26 Claims, 12 Drawing Sheets

Related U.S. Application Data

(60) Provisional application No. 63/050,445, filed on Jul. 10, 2020.

(58) Field of Classification Search
USPC ............ 235/380, 375, 487; 705/5, 76, 78
See application file for complete search history.

(56) References Cited

U.S. PATENT DOCUMENTS

| | | |
|---|---|---|
| 9,147,117 B1 | 9/2015 | Madhu et al. |
| 10,503,912 B1 | 12/2019 | Kerr |
| 2006/0174323 A1 | 8/2006 | Brown et al. |
| 2007/0079136 A1 | 4/2007 | Vishik et al. |
| 2009/0132813 A1 | 5/2009 | Schibuk |
| 2010/0250955 A1 | 9/2010 | Trevithick et al. |
| 2012/0089519 A1 | 4/2012 | Peddada |
| 2012/0144461 A1 | 6/2012 | Rathbun |
| 2013/0097047 A1* | 4/2013 | Kim ............... G06Q 20/023 705/26.4 |
| 2014/0020073 A1 | 1/2014 | Ronda et al. |
| 2014/0089117 A1 | 3/2014 | Schumacher |
| 2014/0129255 A1 | 5/2014 | Woodson et al. |
| 2014/0207537 A1 | 7/2014 | Joyce et al. |
| 2016/0055322 A1 | 2/2016 | Thomas |
| 2016/0078581 A1 | 3/2016 | Maher |
| 2017/0032485 A1 | 2/2017 | Vemury |
| 2017/0069151 A1 | 3/2017 | Saravanan |
| 2017/0094514 A1 | 3/2017 | Kelts et al. |
| 2018/0012324 A1 | 1/2018 | Kelts |
| 2018/0165655 A1 | 6/2018 | Marcelle et al. |
| 2019/0012751 A1 | 1/2019 | Votaw et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0080299 A1 | 3/2019 | Thom et al. |
| 2019/0163876 A1 | 5/2019 | Remme et al. |
| 2019/0164165 A1 | 5/2019 | Ithabathula |
| 2019/0287111 A1 | 9/2019 | Cvetkovich et al. |
| 2020/0027145 A1* | 1/2020 | Tuli ............... G06Q 30/0609 |
| 2020/0168306 A1 | 5/2020 | Chen et al. |
| 2020/0322800 A1 | 10/2020 | Ozanian |
| 2020/0351089 A1* | 11/2020 | Wentz ............ G06Q 20/3827 |

* cited by examiner

SYSTEM AND METHOD FOR MERCHANT AND PERSONAL TRANSACTIONS USING MOBILE IDENTIFICATION CREDENTIAL

CROSS-REFERENCE TO RELATED APPLICATIONS

The application is a continuation of U.S. patent application Ser. No. 17/205,856, filed on Mar. 18, 2021, entitled USE OF MOBILE IDENTIFICATION CREDENTIAL IN MERCHANT AND PERSONAL TRANSACTIONS, which is a nonprovisional of and claims the benefit of priority from U.S. Provisional Patent Application No. 63/050,445, filed on Jul. 10, 2020, entitled USE OF MOBILE IDENTIFICATION CREDENTIAL IN MERCHANT AND PERSONAL TRANSACTIONS, the entire disclosures of which are incorporated herein by reference.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of processing transactions between parties, including commercial and personal transactions and, more specifically, to transactions that make use of mobile identification credentials.

BACKGROUND

Verifying personal identity is an important aspect of carrying out a transaction between parties, such as the sale of goods and services between buyers and sellers. A secure and reliable approach is needed regardless of whether the transaction is in person (e.g., at the point-of-sale) or online between remotely located parties. Existing approaches include the use of identification (ID) cards, personal identification numbers (PINs), username and password, and "captcha" or a similar challenge-response test used to determine whether or not the user is human by displaying a human-readable text that the user must enter to gain access. These approaches have shortcomings and are subject to fraud. Establishing the trustworthiness of information being exchanged between parties to a transaction to verify identity and other key aspects of the transaction is of paramount interest.

In an embodiment, a buyer wishes to purchase goods or services from a seller. Doing so in person typically requires proof of identify such as showing an identification card. An electronic transaction from a remote location typically requires the use of a password-protected account or a PIN. Such identity verification performed in person or remotely is subject to human error or fraud. A password-protected account can be hacked. A PIN or a password can be stolen. The same issue arises in situations involving other types of transactions between two or more parties. Examples include online transactions for the sale of goods or services, the exchange or goods or services, auctions, and the like.

SUMMARY

Embodiments of the present invention are directed to apparatuses and methods for providing a convenient and secure way for merchants, consumers, and other parties to engage in transactions, including commercial transactions, by leveraging a mobile identification credential (MIC). Embodiments enable a consumer/user to verify his or her identity and optionally other biographic data (e.g., age, driver's license information, etc.) in person at the merchant's point of sale or electronically from a remote location. The risk of fraud or mistake in the transaction is reduced by the trust that accompanies use of the MIC. In this disclosure, "user" and "requesting party" are used interchangeably to refer to the MIC user as a party to a transaction making a request in the transactions context. The requesting party may be a buyer, a consumer, or a "first party" in the examples described below.

In one embodiment, the buyer makes a request to receive goods or services in person. The buyer presents a user mobile-identification-credential device (UMD) that includes a MIC such as a mobile driver's license (mDL) as part of an environment that supports MICs. In such an environment, the MIC is issued by an Authorizing Party (AP), such as a state department of motor vehicles (DMV) or some other issuing authority, using an Authorizing Party System (APS). The UMD interacts with another device to share some or all of the content of the MIC. The device that is to receive the MIC information is held by the seller, which is a relying party (RP) that will rely on the information yielded via the MIC. The device of the relying party is referred to as a Relying Party System (RPS). Upon verifying the identity of the user/consumer/buyer, the requested goods or services are released by the RPS to the buyer. The identity verification is used to enable to buyer to use electronic payment or to receive the goods or services that have been paid for previously. In another embodiment, the request may be made from a remote location via a network. In that case, an additional liveness check may be typically used to ensure the request is made by the person matching the MIC.

An aspect of the present invention is directed to a method, for a transaction between a first party using a first party system and a second party using a second party system whereby the first party agrees to transfer a first item to the second party and the second party agrees to transfer a second item to the first party. The method comprises receiving, by the second party system from the first party system, a request for transfer of the second item of the transaction to the first party system; sending, by the second party system to the first party system, a request for identification information of the first party; receiving, by the second party system, part or all of first party information associated with a first MIC which the first party system received from a first authorizing party system (APS), the first party having consented to release the part or all of first party information to the second party system, and the part or all of first party information having been verified; using, by the second party system, the verified part or all of first party information associated with the first MIC to verify or not verify an identity of the first party; verifying the identity of the first party before granting the request, by the second party system, to transfer the second item to the first party in exchange for transferring the first item from the first party to the second party.

Another aspect of the invention is directed to a transaction between a first party using a first party system and a second party using a second party system whereby the first party agrees to transfer a first item to the second party and the second party agrees to transfer a second item to the first party. The second party system comprises a computer programmed to: receive, from the first party system, a request for transfer of the second item of the transaction to the first party system; send, to the first party system, a request for identification information of the first party; receive part or all of first party information associated with a first MIC which the first party system received from a first authorizing party system (APS), the first party having consented to release the part or all of first party information to the second party system, and the part or all of first party information having been verified; use the verified part or all of first party information associated with the first MIC to verify or not verify an identity of the first party; verify the identity of the first party before granting the request to transfer the second item to the first party in exchange for transferring the first item from the first party to the second party.

Another aspect of this invention is directed to a method, for a transaction between a first party using a first party system and a second party using a second party system whereby the first party agrees to transfer a first item to the second party and the second party agrees to transfer a second item to the first party, via an escrow provider using an escrow provider system. The method comprise: receiving, by the escrow provider system from the first party system, a request for transfer of the second item of the transaction to the first party system; sending, by the escrow provider system to the first party system, a request for identification information of the first party; receiving, by the escrow provider system, part or all of first party information associated with a first MIC which the first party system received from a first authorizing party system (APS), the first party having consented to release the part or all of first party information to the escrow provider system, and the part or all of first party information having been verified; using, by the escrow provider system, the verified part or all of first party information associated with the first MIC to verify or not verify an identity of the first party; sending, by the escrow provider system to the first party, a request for information showing that the first party has met escrow obligations to receive the second item; receiving, by the escrow provider system, part or all of first party escrow fulfillment information associated with an escrow MIC which the first party system received from an escrow APS, which is the first MIC issued by the first APS or another MIC issued by another APS, the first party having consented to release the part or all of first party escrow fulfillment information to the escrow provider system, and the part or all of first party escrow fulfillment information having been verified; using, by the escrow provider system, the verified part or all of first party escrow fulfillment information to verify or not verify escrow fulfillment of the first party; verifying the identity of the first party and verifying the escrow fulfillment of the first party before granting the request, by the second party system to the escrow provider system, for transfer of the second item to the first party.

Another aspect of the present invention is directed to a system for a transaction between a first party using a first party system and a second party using a second party system whereby the first party agrees to transfer a first item to the second party and the second party agrees to transfer a second item to the first party, the first party system including a first computer programmed to perform operations according to first instructions, the second party system including a second computer programmed to perform operations according to second instructions, the first party system having received from a first authorizing party system (APS) a first MIC, the first APS including an APS computer programmed to perform operations according to APS instructions. The first party system sends, to the second party system, a request for transfer of the second item of the transaction to the first party system. The second party system sends, to the first party system, a request for identification information of the first party. The first party system receives, from the first party, consent to release part or all of first party information associated with the first MIC. Either (i) the first party system sends, to the second party system, the consented part or all of first party information, and the first APS verifies the part or all of first party information associated with the first MIC or (ii) the first APS sends, to the second party system, the consented part or all of first party information as verified part or all of first party information associated with the first MIC. The second party system uses the verified part or all of first party information associated with the first MIC to verify or not verify an identity of the first party. The identity of the first party is verified before the second party system grants the request to transfer the second item to the first party in exchange for transferring the first item from the first party to the second party.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

Examples of Transactions

Figure 1:
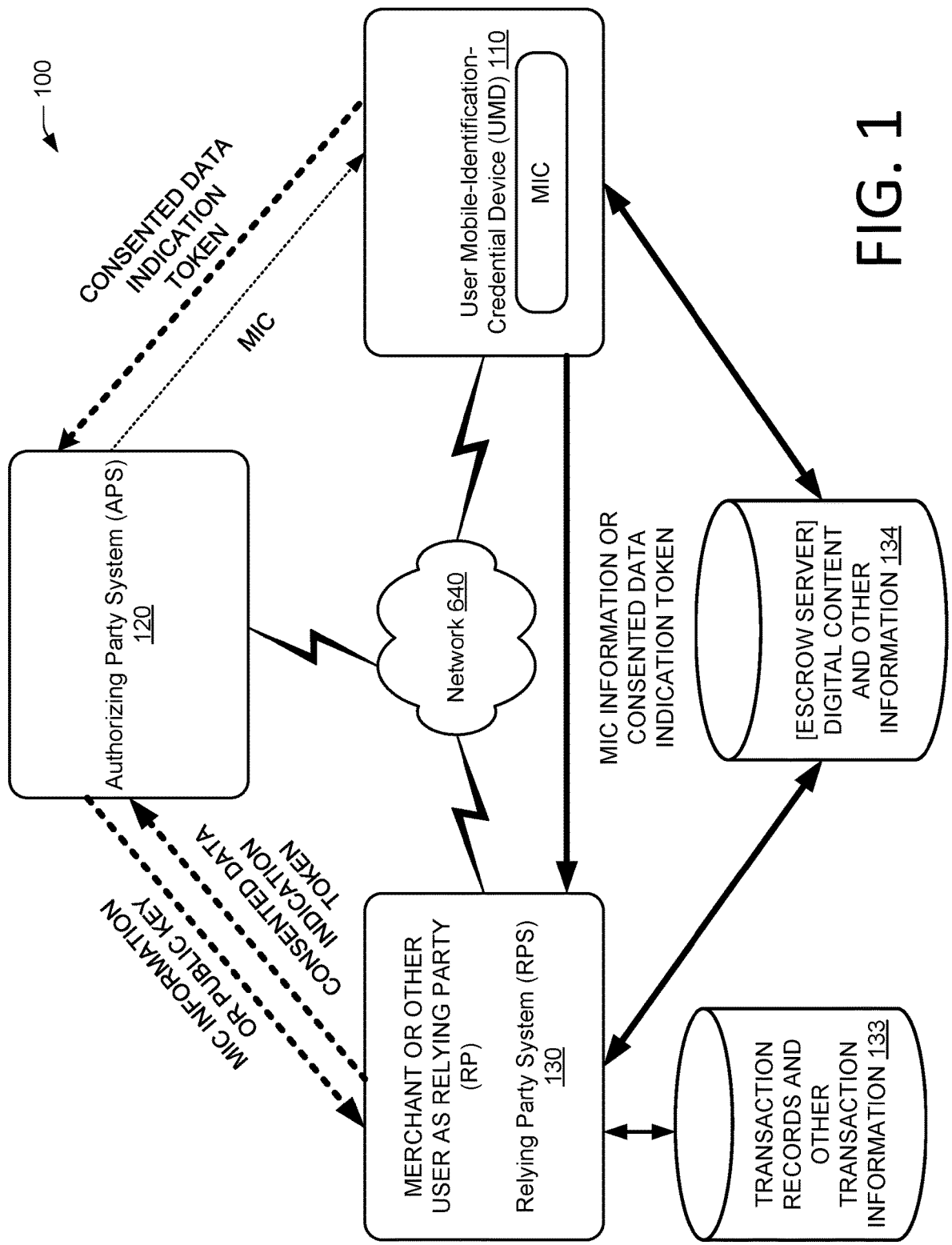
FIG. 1 shows an example of an overall system employing mobile identification credentials in transactions between parties.

In one example, the consumer has already paid for a purchase, and appears at the merchant's store for pickup. In another example, the consumer communicates remotely with the merchant to provide shipping instructions. These embodiments establish trust that the merchandise is given to the proper person or shipped to the proper address, for example, by matching the merchant's expectations based on previous interactions with the consumer, such as confirming that the consumer appearing in person for in-store pickup is the one who placed the order and paid for it online. The experience of the consumer is enhanced, and embodiments support easier and more trustworthy transfer of the merchandise. Here, the example of the purchase of goods illuminates the discussion but is not intended to limit the scope; other situations that involve the purchase of services, the exchange of goods or services, and other commercial transactions involving other things of value or financial/commercial instruments are included. Various embodiments address these concerns.

In another example, the transaction involves an exchange of goods and/or services between two parties. Each party needs to establish his or her identity and, as such, will play the role of the user via a UMD while the other party will play the role of the relying party via an RPS. That is, each party will play dual roles using a device that operates in UMD mode and in RPS mode. In some embodiments, the exchange can involve simultaneous transfers of the goods and/or services; in other embodiments, the transfers occur in different places and/or times.

In another embodiment, the transaction involves access to a physical space, a physical object, an electronic device, or a website or an online service. In a specific example, the UMD receives an electronic key that the user can use to unlock an electronic lock to a physical space such as a door lock or an elevator lock, a physical object such as a briefcase, or an electronic device such as a computer. In the case of the computer, for instance, the UMD serves as a personal identity verification (PIV) card to allow the user to log in by entering a password or passcode.

To instill more confidence in a transaction, another embodiment involves an escrow. Here, two parties enlist a third party to temporarily hold something such as money, paperwork, or other assets. The third party holds the thing or things on behalf of the two parties before their transaction is concluded. That third party, known as an escrow provider, helps make the transaction safer by protecting the assets of the buyer and seller until both parties have met their obligations for the agreement. The money, for example, may be deposited into an escrow account and may be released to complete the transaction after the parties have met their obligations. In that case, additional verification that the party's obligations are met may be required. In one example, verification that the goods have been shipped by the seller may be required before the money in the escrow account is released to the seller. In another example, verification that electronic goods (e.g., involving electronic transfer or download of digital content, file, data, or the like) have been placed in escrow by the seller may be required before the buyer either pays the seller or places the money in the escrow account in exchange for release of the electronic goods from escrow. In these cases, the buyer and seller may verify their identities via the MIC to the escrow holder (serving as the relying party via an RPS) before the escrow holder grants their requests to release items held in escrow.

In yet another example, there may be a limit to the quantity of an item (e.g., merchandise, event ticket, coupon, etc.) that any individual can obtain. The individual needs to establish his or her identity via the MIC to the holder of the item (the relying party) which keeps a record of the quantity obtained by the individual. The relying party holder of the item checks the record of the identity of an individual associated with the quantity already obtained to prevent anybody from exceeding the limit.

For example, one party (a seller) sells tickets to an event such as a concert. To make the event available to a wide range of concert-goers (buyers), the seller implements a rule whereby no buyer is allowed to buy more than four tickets. Without the benefit of a MIC-based transaction, one buyer might nevertheless buy numerous tickets using a variety of online identities they have or use. Such actions would thwart the seller's intention. When buyers must purchase tickets using their MICs, however, the use of multiple online identities by one person can be detected and the seller can thereby deny multiple purchases by the same person.

Another, related example is where a buyer implements automated, online agents (bots) to purchase tickets on the buyer's behalf. Here, too, the requirement that the buyer furnish information the seller can trust (such as name and date of birth from a MIC) permits the seller to prevent multiple purchase attempts whether by a real person or a bot. Moreover, the use of a liveness check enables the seller to distinguish between bots and real people.

In another embodiment, one individual sells a car to another individual. Conventionally, the seller signs the paper automobile title over to the buyer and the buyer registers the title at the state DMV. Here, however, the seller suffers potential risk in the event that the buyer fails to register the title at the DMV. This risk arises from the possibility that the buyer is a malefactor who commits a crime using the vehicle, and then abandons the vehicle. The subsequent official investigation will lead authorities to the seller, not the buyer. The buyer suffers risk as well. If the seller is not actually the person named on the car's title, then the buyer's title to the car is in jeopardy.

According to this embodiment, when the seller sells the car to the buyer, the seller opens a MIC-based transaction that includes not only the buyer, but also the DMV. The DMV verifies to the buyer that the seller has legal title to convey. The DMV verifies the identity of the purchaser as a real person and also logs the title transfer. When the buyer is from a state other than the state of the seller, the DMV that handled the transaction also notifies the relevant office of the buyer's state.

In this embodiment, the use of a MIC eliminates much of the risk to the seller as well as the risk to the buyer. The seller's transfer of title to the buyer is registered with the DMV at the time of transfer; the buyer's title in the purchased vehicle is safer because it was received from an authorized seller, and the DMV records are current. Here, the software to implement the transfer of vehicle title is, in an embodiment, provided by the state DMV.

In a related embodiment, an insurance company gives a preferential automobile insurance rate for insuring a vehicle of an owner who is willing to demonstrate that only authorized drivers operate the vehicle. Conventionally, insurance companies insure vehicles based on the principal operator's driving record but take into account the possibility that the vehicle is operated by someone else such as an inexperienced, new driver (e.g., a teenager).

According to this embodiment, when a vehicle owner is willing to demonstrate that the vehicle in question, such as a luxury sedan, is not operated by the teenager, the insurance company offers coverage for the luxury sedan at a rate lower than that of the situation where the teenager was permitted to drive it. Here, when the vehicle is operated, the driver optionally verifies his or her identity using, for example, a MIC that is a mobile driver's license (mDL). The vehicle acts in the role of an RPS and verifies the driver's identity.

From time to time, the vehicle owner voluntarily transmits a transaction log to the insurance company in exchange for the favorable insurance rate.

In an alternative embodiment, the vehicle owner sets the vehicle to restrict operation to only a predetermined set of identities. Here, the vehicle owner no longer needs to transmit any transactions to the insurance company. Instead, the vehicle owner only needs to demonstrate to the insurance company that the vehicle is set up in this restricted manner, and that the authorized operators are limited to the family members of the vehicle owner, other than the teenage driver.

In a related embodiment, a vehicle owner offers a vehicle for rental to the general public of licensed drivers. Conventionally, this arrangement subjects the vehicle owner to risk. For example, the renter is not a licensed driver, is a bad driver and prone to accidents, or is a malefactor interested only in harming the owner's person or property and undertakes the transaction only to obtain information as to the vehicle owner's address, location, or the like. The renter is also subjected to risk: the vehicle owner does not actually own the vehicle, or the vehicle owner is likewise a malefactor interested only in harming the renter and offers the transaction only to obtain information about the renter such as the renter's name, age, driver's license information, location, or the like.

In this embodiment, the vehicle owner requires the renter to verify his or her identity via a MIC. The vehicle owner can thereby trust that the renter is an actual person who is authorized to drive. If the renter undertakes to harm the vehicle owner, the identity of the renter is known and available to authorities in any subsequent investigation. The renter can also trust the vehicle owner, for example, in that there is a vehicle and that the owner has title to it.

In this embodiment, when the renter interacts with the release dialog, the renter consents to release only some information to the vehicle owner. For example, since the vehicle owner is provided with the renter's identity information, there is no need for the vehicle owner to know the renter's home address; since the renter's mDL or other MIC proves the renter is authorized to operate motor vehicles, there is no need for the vehicle owner to know the renter's age or date of birth. Likewise, when the vehicle owner provides information via their respective release dialog, the vehicle owner consents to release only some information to the renter. For example, the renter needs to know that the vehicle owner has title to the vehicle but does not need to know the vehicle owner's address or other personal information. The vehicle owner, similarly, provides the vehicle location to the renter only when the vehicle owner is satisfied that the renter is a genuine person, not a malefactor, and in an alternative embodiment, only once the renter has also placed sufficient funds with the escrow agent.

In another embodiment, the ability to enter into a MIC-based transaction increases safety and security of online parties interacting on a social website such as a dating website. When a social website is a dating website, one objective is for people to meet in person, one with another. Interactions on social websites and subsequent meetings engineered via social websites present significant risk.

Conventionally, a person who wants to meet other people via a dating website obtains an online account and provides personal information for the dating site to vet the person (i.e., to verify his or her identity, develop an identity profile, identify any concerns such as security, financial, ethical, and moral concerns, and determine whether the person is trustworthy). Users of dating websites, however, are exposed to other users who do not share truthful information about themselves. These other users are sometimes miscreants who put forth an online identity of someone who they are not, sometimes a real person they are impersonating, sometimes a fictitious personality. When a user interacts with such a miscreant, the user may be lured into an in-person meeting. Some of these meetings result in disappointment or even harm to the user.

In this embodiment, the dating site requires all users to provide their identity information via a MIC issued by an official AP such as a state DMV. This step, bolstered by the liveness check, largely eradicates the problem of impersonation and of fictitious personalities. Furthermore, when an in-person meeting is to take place, the identity and age of both parties is known in advance of the in-person meeting. If harm befalls one of the parties, an actual identity of a real person is already in hand for the authorities to investigate. In an embodiment, the image of each party from their MIC may be exchanged prior to the in-person meeting. In another embodiment, an image of a party other than that of the MIC may be supplied, providing that the other image has previously been biometrically matched to the image in the MIC. In a further variation, when the parties meet in person, they undertake, via an app of the dating site, a mutual exchange of MIC information to prove that the person who is at the in-person meeting is the same person as the one on the dating site. Here, the added trust provided by a MIC-based transaction, especially where the AP for the MIC is an official, government organization, enhances privacy and safety for all parties involved.

System Embodiments

FIG. 1 shows an example of an overall system 100 employing mobile identification credentials in transactions between parties. In an environment that supports its use, a Mobile Identification Credential (MIC) can enable a user to conveniently prove the user's identity. One embodiment of a MIC is a mobile driver's license (mDL) issued by an official agency such as a state Department of Motor Vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself may be portable and can be provisioned to devices. Below, the device to which the MIC is provisioned is referred to hereinafter as a User Mobile-Identification-Credential Device (UMD) 110. The term UMD pertains to any device to which a MIC can be provisioned including, without limitation, smart watches, smart fitness bands, smart objects, smart phones, e-readers, tablet computers, smart televisions and displays, smart cameras, laptop computers, desktop computers, servers, kiosks, chips, flash drives, and USB drives.

In an embodiment, the issuer of the MIC (the MIC Issuer) may provision and issue the valid, authentic MIC to the UMD. The MIC issuer may work with a MIC provider to facilitate the provisioning of the MIC to the UMD. The MIC Issuer also may work with a third party to provision the MIC to the UMD. In another embodiment, the user may provision the MIC from one device of the user to another device of the user (e.g., from the desktop computer to the smart fitness band).

A MIC may be validated by an Authorizing Party (AP). In one embodiment, the AP may be an official agency such as a state DMV. In another embodiment, the AP may be a third party empowered by an official agency to perform such verification operations. The AP employs an Authorizing Party System (APS) 120. The APS may provision the MIC to the UMD.

MIC Transactions

MIC transactions can be online or offline. Generally, the UMD 110 may interact or transact with other devices to share some or all of the content of the MIC. The device through which the UMD 110 shares the MIC user information is referred to as a Relying Party System (RPS) 130. The RPS is a system operated by or for a Relying Party (RP). The RPS may obtain MIC user information according to an online mode or an offline mode, based on the RPS's being able to trust the MIC user information and perform verification of the MIC user information, as enabled by the environment in which the MIC is used. In an online mode embodiment, the RPS 130 interacts with the APS 120 to verify the released MIC user information. In an offline mode, the RPS 130 may use a public key from the APS 120 to verify the released MIC user information. Generally, data transfers may be digitally signed, via electronic certificates, to verify authenticity of the data transferred. In addition to or instead of the use of digital signatures, data transfers may be encrypted via public-key cryptography to ensure integrity of the data transfers. Furthermore, data transfers can utilize tokenization to safeguard the online data transfers. Other embodiments rely on combinations of multiple such data protection procedures, as well as other data security best practices.

In some embodiments, secure local or remote connections may be established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key to generate Device 2's public key. Device 2's public key is shared with Device 1. These ephemeral key pairs are used to encrypt and to decrypt messages sent between Device 1 and Device 2. A session begins when the two devices acknowledge each other and open a virtual connection, and ends when the two devices have obtained the information they need from one other and send "finished" messages, terminating the connection. Embodiments may make use of such session keys or other practices for establishing secure local or remote connections.

Online MIC Transactions

Online MIC transactions can involve trust and verification. An online MIC transaction may involve a UMD transferring MIC user information in response to a request from an RPS. The RPS verifies whether the received MIC user information is valid based on an online connection between the RPS and the APS. In an embodiment, the RPS accesses an electronic certificate from the APS to verify the authenticity of the MIC user information received from the UMD. The UMD digitally signs the MIC user information using the electronic certificate from the APS. The UMD can retrieve the electronic certificate at the time of the transaction, either from the APS or from a certificate repository. In other embodiments, when something other than a public key is used to verify the MIC user information, the RPS may submit an electronic document or a digital file or the like to the APS in exchange for a key that may be referred to as an authentication key that is not public. The authentication key may be a public key that refreshes after a very short time, such that the RPS needs to reach out to the APS when it is time to verify the information and uses the public key with a short lifespan before it expires. In other embodiments, cryptography may be based on public/private key pairs.

The RPS or the UMD may perform a liveness check, e.g., by comparing collected biometric information to verified credentials. In an embodiment, an RPS may include a biometric sensor to capture biometric information of the user presenting at the RPS, such as a photograph, a video, a retina scan, a fingerprint, and the like. In another embodiment, the RPS may be configured to request a liveness check from the UMD. Due to the nature of the secure local connection as established through the handshake, the trustworthiness of information from the UMD responsive to the request is preserved. Accordingly, in an embodiment, the UMD may collect and transfer information that the RPS uses to perform the liveness check. For example, the UMD may collect a photograph, fingerprint, and accelerometer information that the RPS uses to determine whether the user's hand motions and/or walking gait are consistent with liveness check information known for the user. In another embodiment, the RPS determines that the UMD is deemed trustworthy for performing its own liveness check, and such UMD liveness determination performed by the UMD is accepted by the RPS. For example, the UMD may be a smartphone performing a facial recognition verification of the user, whose valid result the RPS accepts as verification that the proper user is legitimately in possession of the UMD and presenting the UMD at the RPS.

The interaction between the UMD and the RPS may be in-person, where a user is physically located at the RPS to present the UMD to the RPS. The interaction may be attended, where an attendant or other agent attending the RPS witnesses the transaction, to physically compare the appearance of the user, presenting the UMD at the RPS, against the MIC user information contained on the presented UMD. The interaction between the UMD and the RPS also may be remote, where a user is not physically located at or otherwise physically attending the interaction with RPS. For example, the user may be performing an online transaction using the UMD at home, which remotely transmits MIC user information over a remote connection from the UMD to the RPS located remote from the UMD, e.g., at an online web host.

Online MIC Transactions—Trust

The RPS needs to know, or trust, that the MIC user information obtained from the UMD is unchanged and matches official records. Part of this trustworthiness may be based on how the MIC was securely provisioned or placed onto the UMD, e.g., according to International Organization for Standardization (ISO) standards. Such secure provisioning enables the RPS to trust the MIC and its MIC user information, and also perform verification that such information matches official records pertaining to the person represented in the MIC user information. Trust also may be based on the reputation of the MIC issuer or the APS that provisioned the MIC onto the UMD. Trust further may be based on the trustworthiness of the connection between the RPS and the APS, e.g., based on a connection that is secured by encryption or other technological protections. In an embodiment, trust may be also based on the RPS reputation or other information about the RPS, such as Global Positioning System (GPS) coordinates, as detected by the UMD at the location of the transaction between the UMD and the RPS, matching known coordinates for that RPS.

Tokens can be used to establish trust, by exchanging tokens between the UMD, RPS, and APS. In an embodiment, a token or file may not actually contain requested MIC user information. Rather, the token or file may include a consented data indication to indicate which of the user's MIC user information is authorized for release. The APS can exchange the token or file for the MIC user information that is consented to be released by the APS to the RPS. When a user releases MIC user information from the UMD, the UMD passes an RPS token to the RPS and passes an APS token to the APS. The RPS may communicate via an online connection with the APS, which compares the APS token received from the UMD to the RPS token received from the RPS. Upon verifying a match, the APS provides a copy of the MIC user information to the RPS. Thus, the matching of tokens over an online connection enables the APS to trust the transaction and release the requested information, via an online connection, to the RPS. Tokens similarly enable the UMD or RPS to trust the transaction. In another embodiment, the UMD sends an RPS token to the RPS and sends an APS token to the APS; then, the APS releases the MIC user information only if both the RPS token and the APS token are received and only if within a given timeframe.

Online MIC Transactions—Verification

The RPS can verify that the MIC user information is trustworthy. The MIC, as provisioned onto the UMD including the MIC user information, may be electronically signed in an embodiment, to enable the RPS to verify that the MIC is provisioned to the proper UMD belonging to the proper user. Embodiments may use other or multiple data protection procedures, as well as other data security best practices to verify information, connections, transaction participants, or the like. In the online context, the RPS has an online connection to the APS. The online connection enables the RPS to request and receive information or verification directly from the APS. Accordingly, the RPS can perform online verification of MIC user information received locally from the UMD, by comparing the local information against information at the APS. The RPS also can perform a local verification of MIC user information received remotely from the APS, e.g., using data protection or verification procedures, or other data verification best practices.

Offline MIC Transactions

Trust and verification also play a role in offline, or disconnected, MIC transactions. The offline context refers to a condition when one or all parties in a transaction do not have an online connection to each other or to the Internet. For example, the RPS may be in an isolated location, or may be suffering from a communications failure, and therefore lack an online connection for communicating with the APS. Transactions may still proceed, by virtue of the ability of the RPS and UMD to establish a local connection with each other based on trust and verification. An offline MIC transaction may involve the RPS's verifying whether the received MIC user information is valid, without the RPS's having an online connection, e.g., without communicating to an external system such as the APS that can verify whether MIC user information received by the RPS is trustworthy. In an embodiment, the RPS verifies a cryptographic signature on the individual data elements of the MIC user information using, e.g., signer certificates. This ensures the data is genuine and unchanged, based on the RPS's performing a local verification based on cryptographic operations. In another embodiment, the RPS accesses a copy of an electronic certificate stored locally at the UMD, and periodically refreshes locally stored electronic certificates independently of a given transaction. In some instances, the RPS does not have to submit anything to the APS to obtain a public key for that APS, because the RPS keeps a locally stored copy of that APS key. In an embodiment, the RPS periodically checks with the APS to refresh the locally stored public keys. In some cases, there may be a public key distributor (PKD). The distributor would be an agent acting on behalf of several trusted entities. This agent would hold the most up-to-date public keys and distribute to trusted relying parties such as the RPS. Offline MIC transactions may be in-person, attended, or remote, as explained above in the context of online MIC transactions.

Offline MIC Transactions—Trust

Similar to the online context, the RPS can establish trustworthiness in a MIC and MIC user information for offline MIC transactions. As explained above, the RPS can verify that the MIC was securely provisioned or placed onto the UMD, and therefore trust the MIC and its MIC user information, based on cryptographic operations. Trust also may be based on reputations of systems that provisioned the MIC onto the UMD, and the trustworthiness of connections or the technological protections used between systems involved in transactions.

Offline MIC Transactions—Verification

The RPS can perform a local, offline verification that the MIC user information is trustworthy, without an online connection. For example, the RPS may perform local cryptographic operations to confirm electronic signatures of the MIC and MIC user information obtained from the UMD. In an embodiment, the RPS may use digital signatures or encryption to obtain, locally, verification of MIC user information. Such verification is possible when the RPS receives the MIC user information directly from the UMD instead of the APS, e.g., when the RPS is operating in an offline mode. Thus, the RPS does not contact the APS, but instead uses an offline stored public key of the APS to verify that the MIC user information is trustworthy as received from the UMD.

In the MIC environment presented in FIG. 1, a person presents a UMD 110 that includes MIC as part of an environment that supports MICs. The APS 120 electronically provisions the valid, authentic MIC onto the UMD 110, to ensure confidentiality, integrity, and authenticity of the MIC, or may have a third-party facilitate provisioning of the MIC to the UMD 110. The MIC may be associated with MIC information including biographics, biometrics, and other (such as privileges). The MIC may have a compartmentalized structure to enable the user to selectively control and release the information to relying parties. The provisioning of the MIC is done before the transaction and is thus indicated by a more lightly weighted arrow in FIG. 1.

Embodiments of the MIC environment may be compatible with multiple, different forms of identification (ID) and corresponding authorizing parties. The MIC may be capable of storing multiple different forms of ID simultaneously. For example, the MIC environment supports non-governmental forms of ID, including those from private companies, such as digital identification providers, third-party travel support providers, and the like. Embodiments may be compatible with forms of ID and their providers that are authorized by a governmental authority (or a non-governmental authority agreed upon by the relevant parties to the transaction) to provide and/or authorize credentials. For example, embodiments may be compatible with forms of employee IDs or other membership IDs such as real estate licenses, used to prove employment or other membership status (e.g., by including a verifiable employee ID number or other membership ID number).

Figure 3:
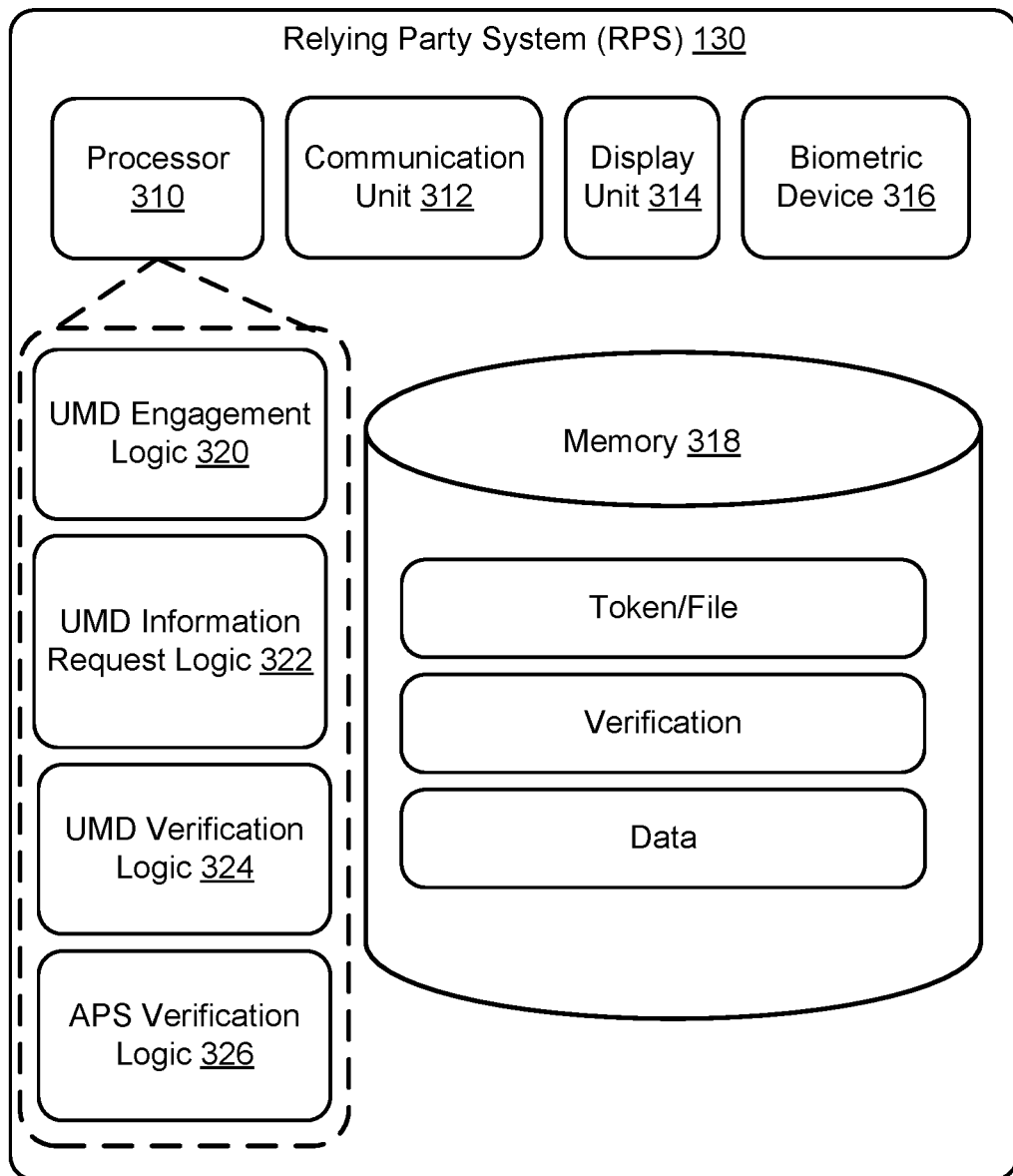
FIG. 3 illustrates a Relying Party System (RPS) according to an embodiment.
Figure 4:
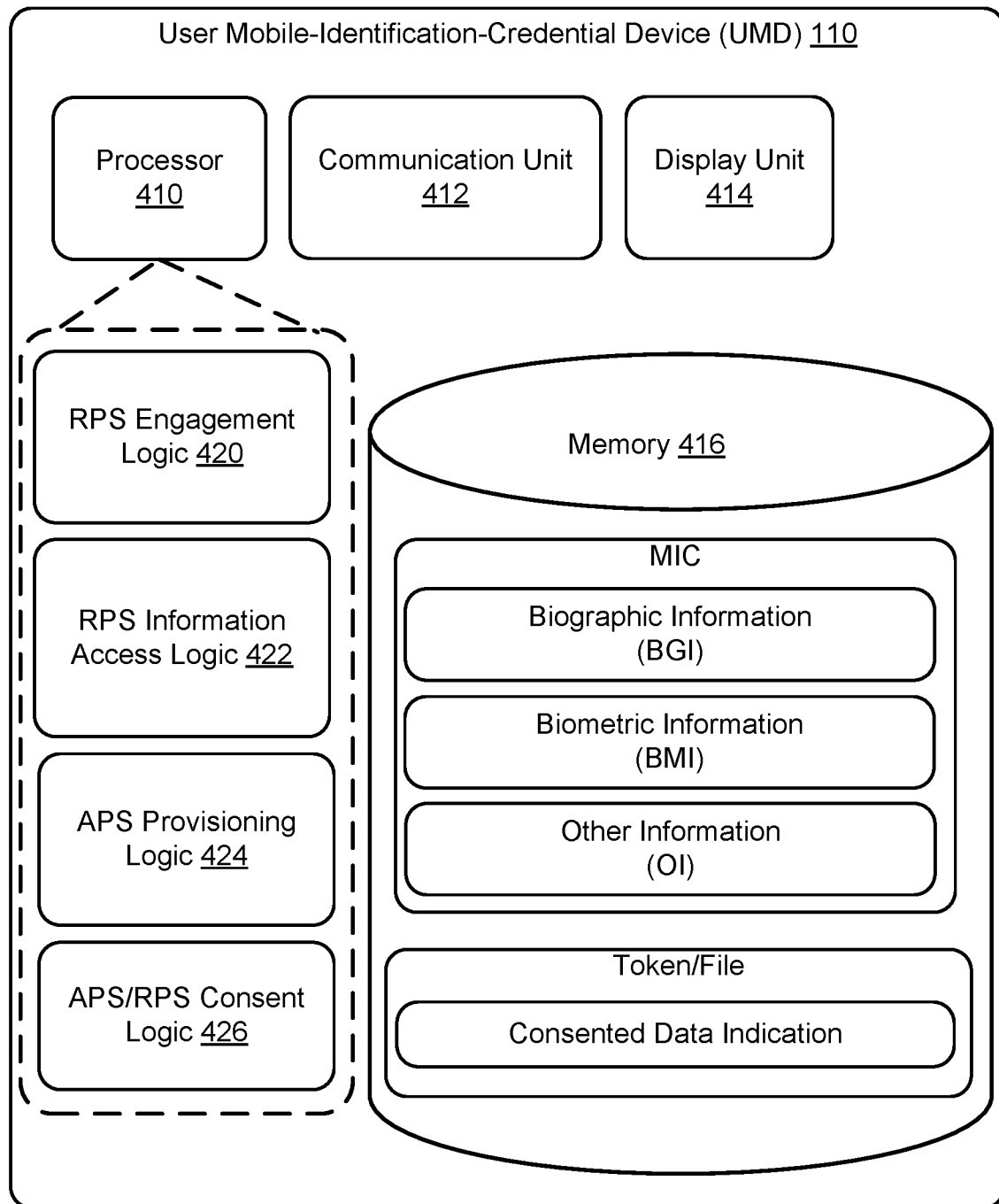
FIG. 4 illustrates a User Mobile-Identification-Credential Device (UMD) according to an embodiment.

As seen in FIG. 1, the UMD 110 interacts with another device to share some or all of the content of the MIC. The device that is to receive the MIC information is held by the merchant or some other user, which is a relying party that will rely on the information yielded via the MIC. The device of the relying party is the RPS 130. The relying party has a database 133 of transaction records (e.g., quantity of items release associated with user ID) and other transaction information; such other transaction information may include biographic information (e.g., age, gender, address, social security number, driver's license number, etc.) and/or biometric information (e.g., photograph, fingerprint, iris or retina scan, etc.). Some embodiments involve an escrow server (escrow provider system) containing digital content and other information 134; such other information may include agreements, contracts, ledger, or the like, as well as biographic/biometric data of the parties involved in escrow. In specific embodiments, such information may be used to verify the identity of the party making a request to release something from escrow (requesting party) and may be optionally used to verify that the requesting party has met his or her obligations. The network 640 facilitates communication between the UMD 110, APS 120, and RPS 130. Examples of the network 640 may include the Internet and a variety of different wired and wireless networks. Examples of the APS 120, RPS 130, and UMD 110 are illustrated in FIGS. 2-4.

Figure 2:
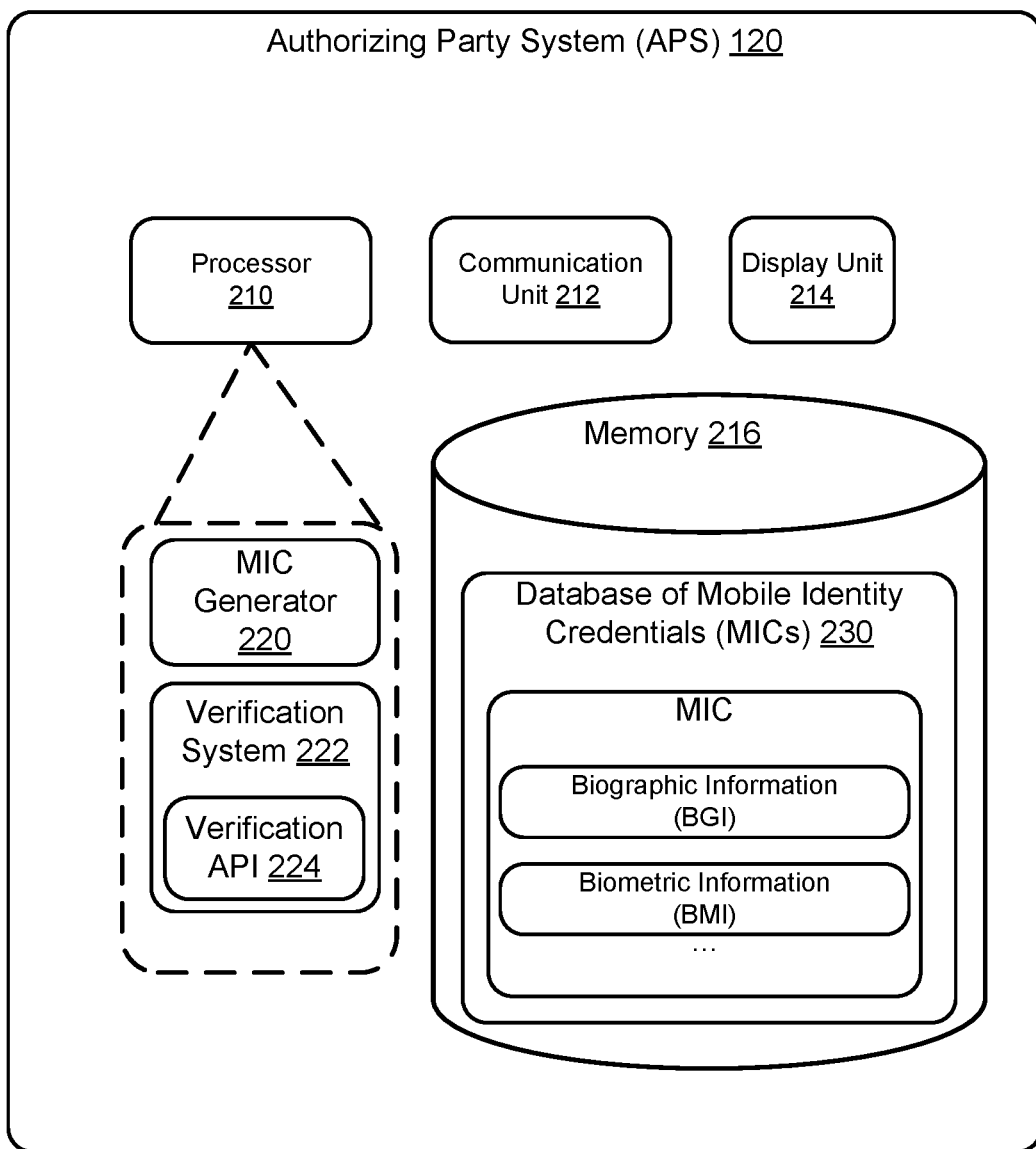
FIG. 2 illustrates an Authorizing Party System (APS) according to an embodiment.

FIG. 2 illustrates an Authorizing Party System (APS) 120 according to an embodiment. The APS 120 includes a processor 210, a communication unit 212, a display unit 214, and a memory 216. The processor may be associated with logic or modules to process information, including a MIC generator 220 and a verification system 222 with a verification Application Programming Interface (API) 224.

The MIC generator 220 enables the APS to generate a MIC for a given user. For example, the MIC generator receives unique information about the user, such as a social security number. The APS can reside in a local DMV office staffed with agents to verify physical documents in person, who traditionally verify that the social security number belongs to that user. The MIC generator creates a framework to build the MIC for the user and populates the MIC with corresponding biographic and biometric information, e.g., as available locally at the DMV office. In some embodiments, the MIC generator 220 populates the MIC with other information corresponding to the user, such as driving privileges or special access. For example, the MIC can be issued or provisioned by the Federal Government, and may include special access, privileges, or MIC user information corresponding to positions at Federal Government agencies. In an example, the APS may be located at the DMV, and an agent of the DMV collects and manually verifies proof of identity that the user provides to the agent in person. In an embodiment, a kiosk at the DMV performs a liveness check of the user and/or otherwise performs unattended verification of the proof of identity that the user provides to the kiosk.

In another embodiment, the MIC generator 220 facilitates verification of the user's identity attributes against official records available to the DMV and/or physically presented by the user. Facilitated verification can be attended by an agent in person, or unattended and self-performed by the user at a kiosk or other automated system. In an embodiment, such facilitated verification involves the use of a system such as a kiosk or electronic device with audio/video playback and recording, visual scanning, or other telepresence capabilities, which the user accesses to interact remotely with an agent from the DMV or other APS that is to provision the MIC. Such a system can be located remote from the DMV or other APS facility, at which the agent is located, and can be separate from the UMD. In an embodiment, the system to interact with the agent may be the UMD that is to receive the MIC. Such system allows an agent at the DMV, through telepresence or other audio/visual interfaces of the system, to visually access, inspect, and verify information submitted as proof of identity (e.g., by scanning or photographing a birth certificate or the like). In another embodiment, such facilitated verification may involve the user's accessing a remote kiosk or smartphone app to virtually interact with an agent that facilitates the identity verification, or to interact with a self-guided verification user interface, such as a website or smartphone app.

Generated MICs may be stored in the memory of the APS and available for provisioning onto the UMD of the user. In an embodiment, a given APS provisions multiple different MICs onto the UMD, e.g., at an APS that provides a mDL and some other ID or proof. Examples include proof of escrow fulfillment which is described in greater detail below in connection with an escrow transaction in FIG. 12, a membership ID, a special coupon, a rebate document, a legal document such as a contract, and the like.

Different types of MICs may be associated with corresponding different levels of assurance (such as multi-factor verification) needed to facilitate verification of the user's identity, whether in-person or remote, attended or unattended, or other aspects of the identity verification. Furthermore, in some embodiments, a given MIC environment may be associated with a corresponding trust framework, such as the transactions field (or the medical or healthcare field or the voting field) and a related set of rules pertinent to maintaining security of the transactions information (or the medical or healthcare information or the voting information). The level of assurance for a given MIC environment corresponds to the trust framework. Additionally, in an embodiment, communications with the MIC generator (and other aspects of the MIC environment including the APS, UMD, and RPS and their various modules or logic) may be facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

The verification system 222 of the APS 120 may be configured to interact with an RPS, such as when handling requests for user information received from an RPS. In the illustrated embodiment, the verification system uses a verification API to handle interactions in a standardized computing format.

The verification system 222 of the APS 120 also may be configured to interact with other systems, such as UMDs (to send or receive tokens), back ends, and the like. In an embodiment, the verification system may be configured to receive a token from the UMD, and a token from the RPS. The verification system then compares the tokens to determine whether the tokens match within an acceptable timeframe. In an embodiment, matching or otherwise verifying the two tokens indicates that the RPS is trustworthy regarding UMD consent and user information.

Generally, the APS verification system 222 verifies various aspects relating to MIC information. For example, the APS verification system may verify whether a request to release user MIC information is legitimate, and if so, authorize the release of such information. In an embodiment, the APS verification system authorizes release of MIC user information to the requesting RPS. In another embodiment, the APS verification system releases MIC user information to the UMD 110, e.g., when provisioning the MIC onto the UMD. In the illustrated example, the verification system uses a verification application programming interface (API) 224 to communicate with other systems requesting verification and/or MIC information, including RPSs and/or UMDs. In some embodiments, the verification system 222 of the APS 120 may be configured to communicate with other systems, such as other APSs including government entities, trusted certificate holders, open ID providers, back ends, and the like. The APS verification system enables such communications to be secure, ensuring the integrity of such communications.

The memory 216 may be associated with a database of MICs 230. A given MIC may include Biographic Information (BGI) and Biometric Information (BMI), which can be selectively requested and provided, e.g., as MIC user information, when the MIC is provisioned onto a UMD. The MIC also can include other information, such as privileges pertaining to the user.

The MIC generally may be structured to securely and discretely store various fields comprising the BGI, BMI, or other information. For example, the BGI may include first name, last name, date of birth, gender, address, identifier number, organ donor status, and the like. In an example, the BMI may include a digital photograph, a digital image representing a QR code containing the BGI, a digital fingerprint representation, a digital retina representation, and the like.

The structure of the MIC enables the other information to be added, such as when provisioning the MIC from the APS to a UMD, or after provisioning the MIC to the UMD, such as when the user enters information into the MIC via the UMD. For example, a user enters supplemental information into the MIC via the UMD, e.g., emergency contact information. Information on the MIC may be compartmentalized and separately accessible.

FIG. 3 illustrates a Relying Party System (RPS) 130 according to an embodiment. The RPS 130 includes a processor 310, a communication unit 312, a display unit 314, a biometric device 316, and a memory 318. The processor may be associated with logic or modules to process information, including UMD engagement logic 320, UMD information request logic 322, UMD verification logic 324, and APS verification logic 326. Embodiments of the RPS may include hardware (biometric device 316) to collect information to perform a liveness check of the user who is present at the location of the RPS, such as a camera, fingerprint reader, retina reader, and the like.

The biometric device 316 may include one or more biometric readers for obtaining biometric information from the user in person at the RPS 130, to be used to match authenticated biometric information in the MIC or otherwise stored in the APS 120 or the RPS 130. Examples include a fingerprint reader for fingerprint matching or recognition, a retina scanner for retina matching or recognition, a facial imaging device or camera for facial matching or recognition, and a voice recording device for voice matching or recognition.

The UMD engagement logic 320 may be configured to enable the RPS to establish a secure local connection with the user's UMD. For example, the UMD engagement logic establishes a key exchange protocol usable by the UMD, via radio frequency or visual communications. In an example, the UMD engagement logic encodes a public key in a QR code and displays the QR code to the UMD. Upon reading the QR code, the UMD responds to the RPS with a key exchange to secure a local connection between the RPS and the UMD. In some embodiments, the secure local connection utilizes protocols such as secure near-field, secure Bluetooth, secure Wi-Fi, or the like.

The RPS's UMD information request logic 322 may be configured to enable the RPS to structure a request for consent from the UMD and transmit that request to the UMD via a secure local connection. The request for consent includes a request for the types of user information which the relying party is requesting by way of the RPS. For example, the request for consent may include a request for the user's date of birth. The request for consent, in embodiments, may include a dialog in which the user is prompted to answer specific questions, via a user interface, regarding whether the user releases the specific information fields, or a set of fields, to the RPS. In specific embodiments, this dialog is referred to as a release dialog.

The UMD verification logic 324 may be configured to enable the RPS to verify whether user information received from the UMD is valid, as set forth above in connection with online and offline MIC transactions.

The APS verification logic 326 may be configured to enable the RPS to verify whether user information received from the APS is valid. Similar to the online and offline approaches described above, the RPS can access an electronic certificate authorized by the APS, whether stored locally or remotely, to digitally verify information received from the APS that is digitally signed by the certificate used by the APS.

The memory 318 may be associated with a token/file, a verification, and data. The RPS makes use of tokens/files for trust and verification. The RPS receives the token/file from the UMD, and the RPS may be configured to pass the token/file to the APS. Thus, the RPS exchanges the token/file at the APS to receive user information. The verification represents a positive confirmation, via the use of electronic signatures/cryptography, that received information (whether from the APS or the UMD), is valid. The data represents the received user information.

FIG. 4 illustrates a UMD 110 according to an embodiment. The UMD includes a processor 410, a communication unit 412, a display unit 414, and a memory 416. The processor may be associated with logic or modules to process information, including RPS engagement logic 420, RPS information access logic 422, APS provisioning logic 424, and APS/RPS consent logic 426.

In an alternate embodiment, the UMD 110 may include removable memory, such as a Universal Serial Bus (USB) flash memory unit or micro Secure Digital (SD) flash memory card. In such embodiments, the memory of the UMD, which contains a provisioned MIC, may be separable from the UMD and/or combinable with a different UMD. In another embodiment, a memory itself serves as the UMD. In such embodiments, a user carries a portable memory UMD containing the user's MIC and/or user consent token/files. Such a portable memory UMD, in embodiments, may be a portable USB flash drive. To conduct a transaction or otherwise provide identification, the user inserts the portable memory into an RPS 130, which interprets the insertion as proximal consent to read the MIC user information (whether directly from the portable memory to the RPS in an offline mode, or indirectly by retrieving a user consent token from the portable memory and forwarding that token to an APS 120 from which the RPS receives MIC user information). In yet another embodiment, the UMD comprises a code, such as an electrically-readable code via magnet, RFID, and the like, or an optically readable code such as barcode, QR code, and the like. In such embodiments, the user conducts a transaction or otherwise provides identification by presenting the code to an RPS including a reader compatible with the code's format. In an embodiment, the RPS may include a keyboard that the user uses to manually type the code. In another embodiment, the RPS may include a card reader to read the code contained in or on a card-format UMD, whether electronically, magnetically, or optically encoded on the card. The RPS reader can verify such identities by using those forms of identity to retrieve biometric information from the APS and performing a comparison with the user to verify that the MIC belongs to that user. In yet another embodiment, the UMD may be a personal identity verification (PIV) card.

The RPS engagement logic 420 may be configured to enable the UMD to establish the secure local connection with the RPS, as set forth above with respect to the description of FIG. 3.

The RPS information access logic 422 may be configured to enable the UMD to allow the RPS to access the MIC user information associated with the MIC (whether stored at the UMD for offline mode access or stored at the APS for online mode access). In the context of allowing access to MIC user information stored on the UMD, passive access involves the UMD enabling the RPS to read data from the UMD. Active access involves the UMD transmitting data to the RPS. Allowing access furthermore may include the UMD authorizing release of MIC user information from the APS to the RPS, which similarly involves passive or active access between the RPS and the APS. The RPS information access logic 422 may be responsive to the UMD information request logic, as set forth above with respect to the description of FIG. 3.

The APS provisioning logic 424 may be configured to enable the UMD to receive a MIC from the APS and store the received MIC securely on the UMD. The APS provisioning logic may be responsive to the MIC generator as set forth above and as described in connection with FIG. 2. In an embodiment, the APS provisioning logic communicates with the APS to indicate readiness for provisioning the MIC from the APS onto the UMD. In some embodiments, the APS provisioning logic may be configured to provision multiple MICs onto the UMD. For example, the APS provisioning logic provisions a first MIC corresponding to a mobile Driver's License (mDL), and a second MIC corresponding to some other ID or proof such as, e.g., proof of escrow fulfillment, a membership ID, a special coupon, a rebate document, a legal document such as a contract, and the like. The UMD stores the MIC in the memory as illustrated, including the various information of the MIC such as the BGI, BMI, and OI.

The APS/RPS consent logic 426 may be configured to enable the UMD to receive requests for the consent and release of MIC information. The APS/RPS consent logic may be configured to generate, responsive to received requests, corresponding compartmentalized and/or discrete prompts for the user's consent to selectively indicate approval to release such MIC information. In an example, the APS/RPS consent logic may be configured to interact with the UMD information request logic, as set forth above and described in connection with FIG. 3. In an embodiment, the APS/RPS consent logic 426 receives the user's selective consent and sends the consent to the APS whereby the APS acts in accordance with the consent. In another embodiment, the APS/RPS consent logic receives the user's selective consent and directs the UMD to selectively release the MIC user information in accordance with the consent.

The memory 416 may be associated with at least one MIC and a Token/File. The MIC may include MIC user information such as Biographic Information (BGI), Biometric Information (BMI), and Other Information (OI) such as privileges. The Token/File may include a consented data indication. In an offline embodiment, the APS/RPS consent logic obtains consent and transmits the requested BGI, BMI, and/or OI (e.g., using a secure communication link and a verification protocol to digitally sign the requested information) from the UMD to the RPS. In an online embodiment, the APS/RPS consent logic obtains consent and transmits, to the APS, the token/file (as stored in the memory) which contains a consented data indication. The token/file does not actually contain the requested MIC information. Rather, the token/file may include the consented data indication which indicates which of the user's MIC information is authorized for release by the APS. Such consented data indication is used by the RPS. The RPS passes the consented data indication to the APS, which exchanges the token/file for the MIC user information that is consented to be released. The APS then releases to the RPS (e.g., allows access by the RPS) the consented MIC user information.

As used herein, a UMD is not required to be mobile. It is meant to encompass stationary devices such as desktop computers and portable devices such as laptop and notebook computers as well as mobile telephones. In a specific embodiment, the requested MIC may be transmitted from the APS to a stationary intermediary device, which serves as the UMD that subsequently transmits the MIC to a user mobile telephone. This is a typical example of a request made from a remote location such as a person's home using the person's computer as the UMD.

In another embodiment, the user presents to the RPS the MIC in the form of a computer-readable storage medium such as a USB dongle instead of a UMD. For example, the storage medium may be a removable memory from the UMD. In such a scenario, the RPS may be configured to read the MIC from the user's storage medium and, optionally, receives input from the user via a user interface consenting to access part or all of the MIC information and/or decrypting the stored data if necessary. At the end of the transaction, when all verifications are done, the RPS provides the requested item (e.g., in the form of goods or services or an experience) to the user in person and/or transfers electronic data to the user's storage medium including, for example, a shipping confirmation of the item being sent to the user's address, receipt for local or later pick up, a legal document, a financial instrument, a ticket, a membership, information sought by the user, a digital transfer, a digital download, proof of payment, proof of deposit, and proof of money transfer.

In yet another embodiment, instead of using a UMD or a computer-readable storage medium, the user may present to the RPS, in person or remotely, an electronic key or digital code, which the RPS can use to access the user's MIC stored in a third-party storage medium, such as a cloud storage medium. At the end of the transaction, when all verifications are done, the RPS provides the requested item to the user in person and/or transfers electronic data to the user's device regarding the delivery of the requested item.

Process Embodiments

To verify the identity of the requesting party to a transaction or user making a request to release an item, the RPS 130 requests user identification (ID) information of the requesting party or user, which may include some or all of the content of the MIC. The user has the option of consenting to release selectively some or all of the requested information. The item can be anything of value to the party who wishes to acquire it. Examples include purchase of goods, purchase of service, rental of goods, rental of service, use of goods, use of service, access to a physical building or object, login access to a device, access to a website or online service, a legal document, a financial instrument, a ticket, a membership, an experience, information sought by the requesting party, a digital transfer, a digital download, a gift card, a coupon, money (physical or digital), a payment, and a deposit. If the user ID information provided appears suspicious, additional information may be required.

Figure 5:
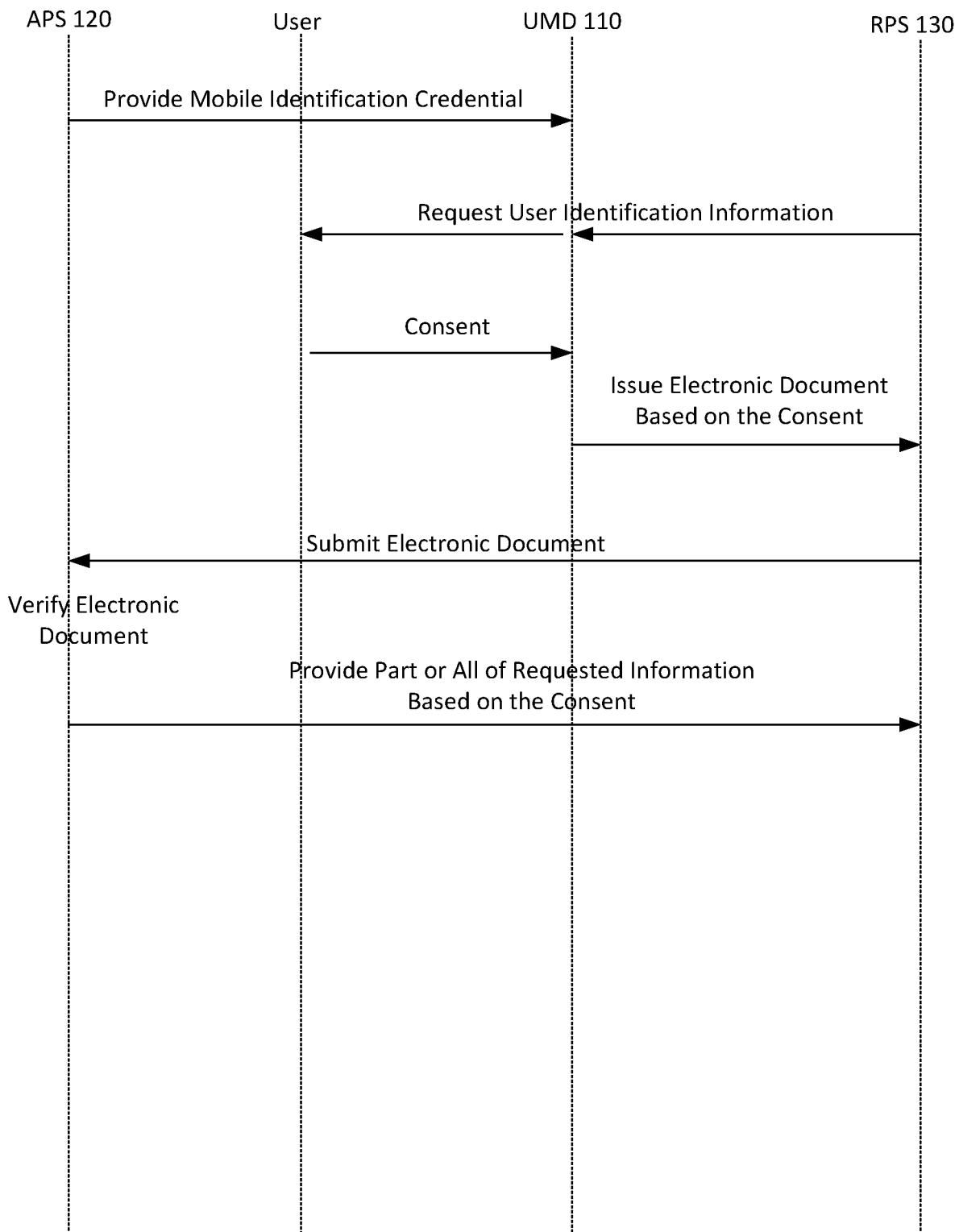
FIG. 5 illustrates verifying information of a party to a transaction using mobile identification credential (MIC) according to an embodiment.

In an embodiment illustrated in FIG. 5, the user of the UMD 110 seeks the transfer of an item from the RPS 130. In response to a request for user ID information from the RPS 130, the UMD 110, having received the MIC from the APS 120, may issue an electronic document or a digital file such as a digital certificate or a key with consented data indication, based on the user's consent, to the RPS 130. Examples of the relying party include a seller, a merchant, an escrow provider, and the like. The RPS 130 may submit the electronic document to the APS 120. Upon verification of the electronic document, the APS may provide some or all of the requested information which is associated with the MIC to the RPS 130, as determined by the scope of the consent. For instance, the user may choose to release a photograph and none of the other information such as age, driver's license number, address, etc. When the received electronic document is not verified by the APS, the APS 120 may send the UMD 110 a notification to resubmit the request for identification information of the first party. When the identity of the user is verified to the satisfaction of the relying party, the RPS 130 can release the requested item to the user. A physical item can be transferred to the user in person or shipped to the user. A digital item can be downloaded or otherwise transferred to the UMD 110. The transaction can be an in-person transaction or an online transaction done remotely between parties.

Figure 6:
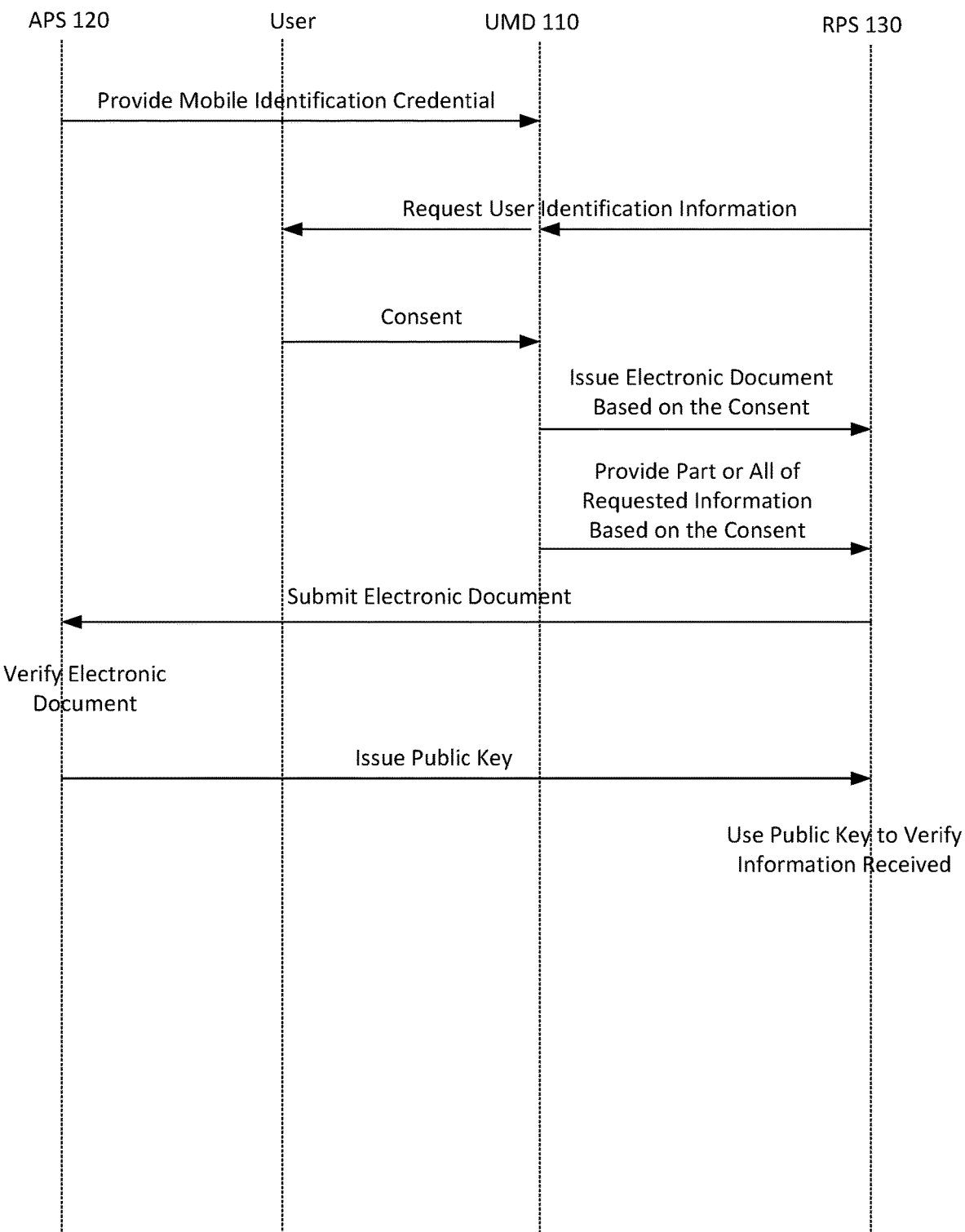
FIG. 6 illustrates verifying information of a party to a transaction using MIC according to another embodiment.

In another embodiment illustrated in FIG. 6, the UMD 110, having received the MIC from the APS 120, receives a request for user ID information from the RPS 130. In response, the UMD 110 may issue an electronic document or a digital file, based on the user's consent, to the RPS 130. In addition, the UMD 110 may provide to the RPS 130 part or all of the requested information, which is associated with the MIC, based on the consent. The RPS 130 may submit the electronic document to the APS 120. Upon verification of the electronic document, the APS 120 may issue a public key to the RPS 130. The RPS 130 may use the public key to verify the information received from the UMD 110. In specific embodiments, the information was encrypted or digitally signed using a private key and the public key is used to decrypt the encrypted information or read the digitally signed information. When the identity of the user is verified, the RPS 130 can provide the requested item to the user or the UMD 110.

In some instances, the RPS 130 does not have to submit anything to the APS 120 to obtain the public key. In general, the only time the RPS 130 will have to go to the APS 120 is to refresh the public keys. In some cases, there may be a public key distributor (PKD). The distributor would be an agent acting on behalf of several trusted entities. This agent would hold the most up-to-date public keys and distribute to trusted relying parties.

The use of a public key to authenticate a digital signature or the like is merely an example. In other embodiments, the APS 120 may issue another electronic document or digital file or the like (e.g., referred to as "authentication key") which the RPS 130 can use to verify that the information received from the UMD 110 can be trusted to establish the identity of the user (i.e., to verify the authenticity of the information received). In one example, the authentication key may be a public key that refreshes after a very short time, thereby requiring the RPS 130 to reach out to the APS 120 when it is time to verify the information and use the public key with a short lifespan before it expires.

When the received electronic document is not verified by the APS, the APS 120 may send the RPS 130 a notification to resubmit the request for identification information of the first party. When the identity of the user is verified to the satisfaction of the relying party, the RPS can release the requested item to the user which can involve physical transfer, shipping, or digital transfer to the UMD 110.

Figure 7:
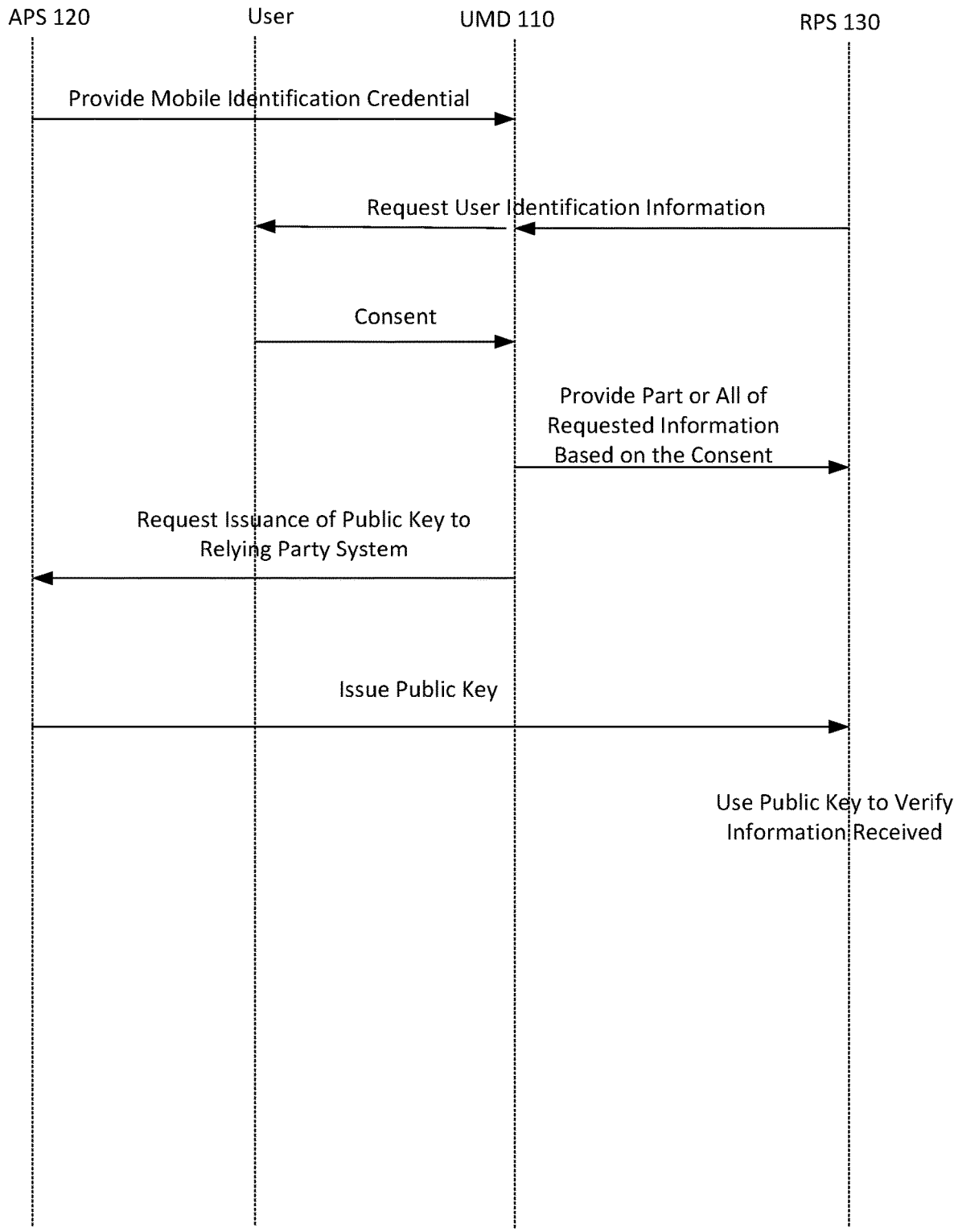
FIG. 7 illustrates verifying information of a party to a transaction using MIC according to another embodiment.

In another embodiment illustrated in FIG. 7, the UMD 110, having received the MIC from the APS 120, receives a request for user ID information from the RPS 130 and provides part or all of the requested information associated with the MIC to the RPS 130 based on the user's consent. The UMD 110 may request that the APS 120 issue a public key to the RPS 130. The APS 120 may issue the public key to the RPS 130, which uses the public key to verify the information received from the UMD 110. Again, the public key is merely an example. It can be replaced with another electronic document or digital file or the like (e.g., "authentication key") which the RPS 130 can use to verify that the information received from the UMD 110 can be trusted to establish the identity of the user. When the identity of the user is verified to the satisfaction of the relying party, the RPS can release the requested item to the user which can involve physical transfer, shipping, or digital transfer to the UMD 110.

Figure 8:
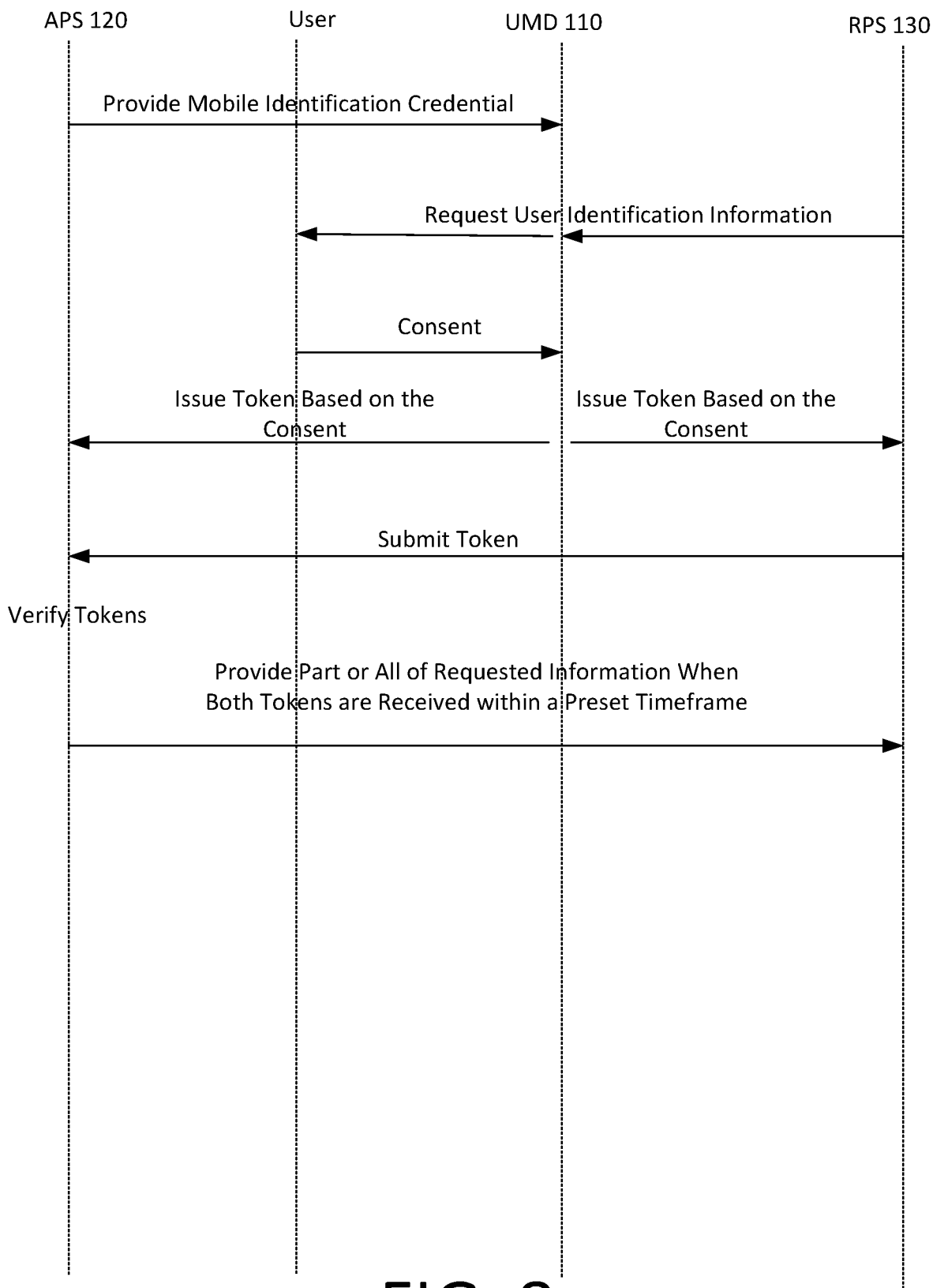
FIG. 8 illustrates verifying information of a party to a transaction using MIC according to another embodiment.

In another embodiment illustrated in FIG. 8, the UMD 110, having received the MIC from the APS 120, receives a request for user ID information from the RPS 130. In response, the UMD 110 may issue, based on the user's consent, a token to the RPS 130 and another token to the APS 120. The RPS 130 may submit the received token to the APS 120. When both tokens are received within a preset timeframe (e.g., within 30 minutes, within 10 minutes, within 3 minutes, within 1 minute, within 30 seconds, etc.) and are matched or otherwise verified by the APS, the APS 120 may provide part or all of the requested information associated with the MIC to the RPS 130. When the tokens are not received by the APS within the preset timeframe or are not verified by the APS 120, the APS 120 may send a notification to the RPS 130 to resubmit the request for ID information of the user. When the identity of the user is verified to the satisfaction of the relying party, the RPS can release the requested item to the user which can involve physical transfer, shipping, or digital transfer to the UMD 110.

In an embodiment, when the user requests the item from a remote location or at an unattended kiosk, the system may incorporate a liveness check as described above. The liveness check ensures that the person making the request for the item via the UMD 110 is the proper user of the UMD 110 instead of someone else who has taken control of or gain access to the UMD 110 or instead of a bot.

Figure 9:
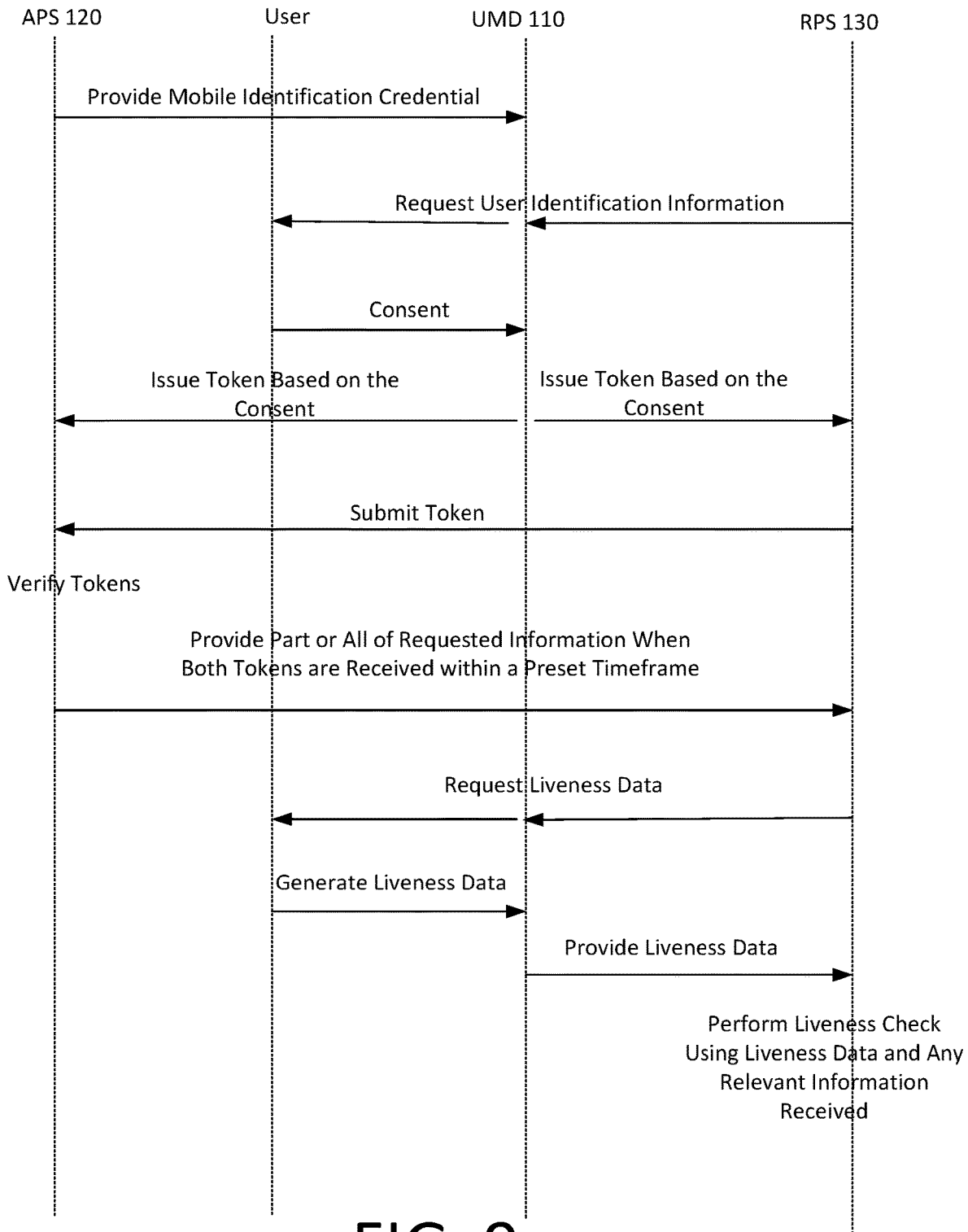
FIG. 9 illustrates performing a liveness check of a party to a transaction according to an embodiment.

In another embodiment illustrated in FIG. 9, which builds upon FIG. 8, the RPS 130 requests liveness data from the UMD 110. The user may generate the liveness data using the UMD 110, which provides the liveness data to the RPS 130. Examples of the liveness data include a live facial image, a live video, a live iris or retina scan, and a live fingerprint scan of the user taken using the UMD 110. While a liveness check that involves biometrics is generally more reliable, it does not require biometrics and can involve taking certain live actions that can be detected and verified. The RPS 130 may perform the liveness check using the liveness data and any relevant information received (e.g., comparing the live image or video with a photograph of the user contained in the MIC). While the embodiment illustrated in FIG. 9 shows that the liveness check is performed after the identity verification process, the order can be reversed in other embodiments.

Figure 10:
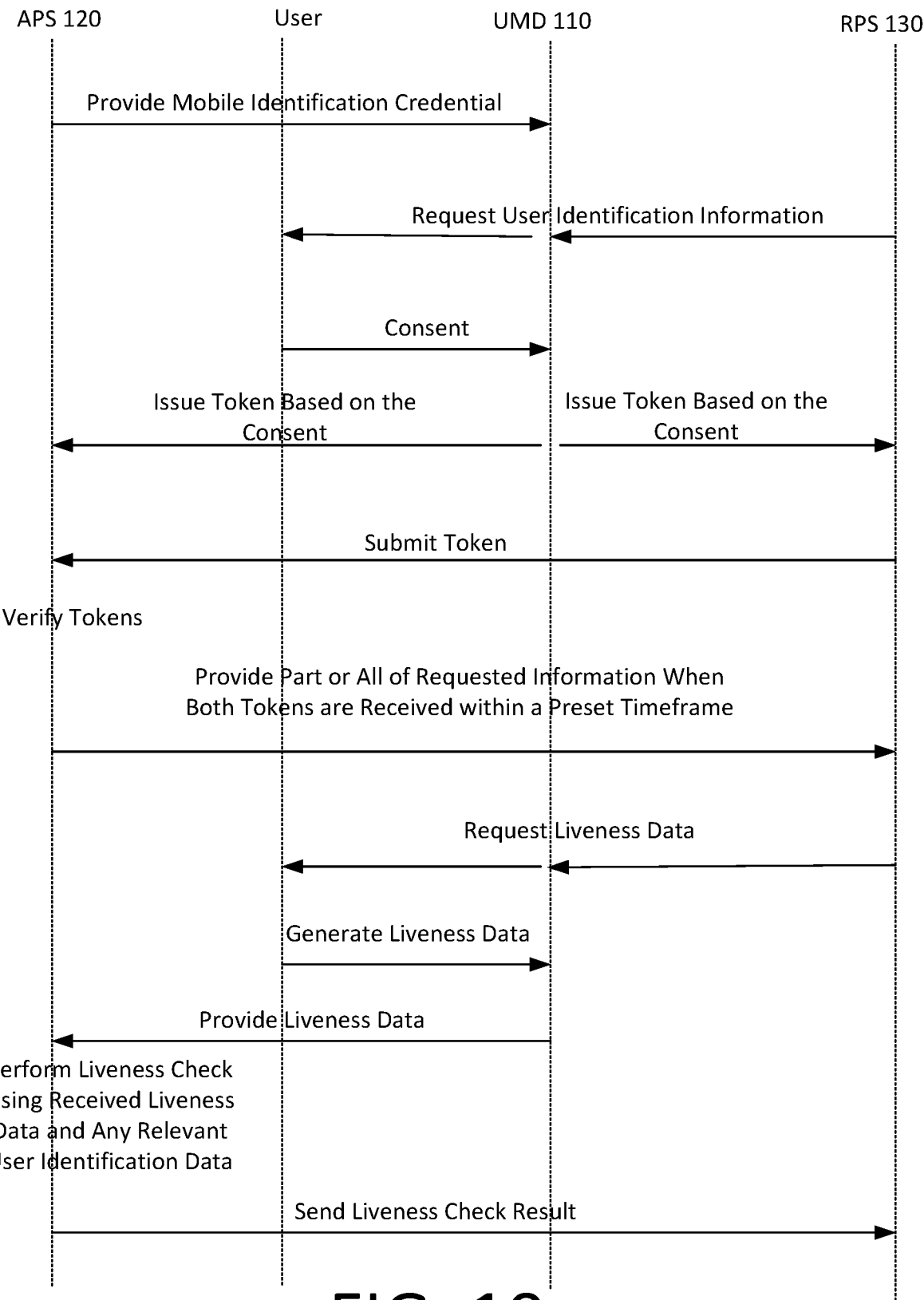
FIG. 10 illustrates performing a liveness check of a party to a transaction according to another embodiment.

In another embodiment illustrated in FIG. 10, which builds upon FIG. 8, the RPS 130 requests liveness data from the UMD 110. The user may generate the liveness data using the UMD 110, but instead of providing the liveness data to the RPS 130 as in FIG. 9, the UMD 110 provides the liveness data to the APS 120. The APS 120 may perform the liveness check using the received liveness data and any relevant user information such as stored user ID data (e.g., contained in the MIC), and sends the liveness check result to the RPS 130.

Other embodiments of identity verification are possible. For instance, different features of the processes of FIGS. 5-10 can be combined to create new embodiments.

The embodiments in FIGS. 5-10 show devices that connect to the APS 120, e.g., via the Internet, during the transaction. The RPS 130 can obtain, directly from the APS 120, the MIC information (FIGS. 5 and 8) or a public key or some other electronic document or digital file to verify the authenticity of the MIC information that the RPS 130 has received (FIGS. 6 and 7). Signer Certificates or the like from a Trust List can be used to validate the Base URLs of the APS 120.

When there is no connection with the APS during the transaction, local transmission links between the UMD 110 and the RPS 130 can be made through directed action by the UMD 110 such as a tap or showing a QR code to the RPS 130. The connection may then be secured by standardized key exchange and encryption of the transport of data. The RPS 130 can verify that the data received from the UMD 110 is valid and unchanged using Signer Certificates from a Trust List, or the public key of the APS which is available, or the like. The process ensures that the MIC information received by the RPS 130 from the UMD 110 was not cloned from another, different UMD.

Figure 11:
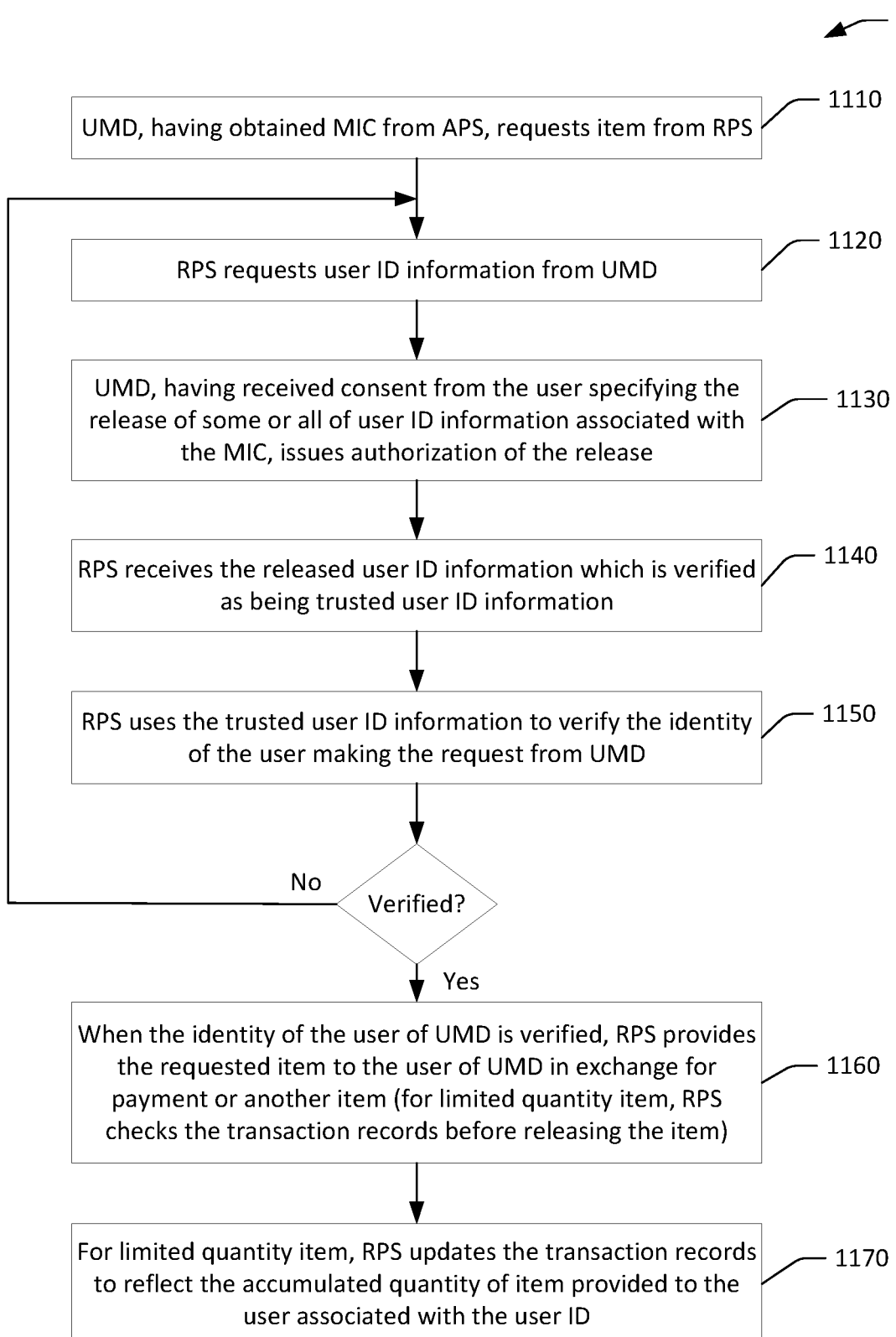
FIG. 11 is a flow diagram illustrating an embodiment of a process for requesting release of an item by a requesting party to a transaction.

FIG. 11 is a flow diagram 1100 illustrating an embodiment of a process for requesting release of an item by a requesting party to a transaction. In step 1110, the UMD (e.g., requesting party's or user's device), having obtained the MIC from the APS (e.g., DMV system), requests an item from the RPS (e.g., merchant or seller) using a secure connection, for instance, via a secure network. The UMD may be a mobile device presented at the point-of-sale (POS) to the POS system, or some other device (stationary or mobile) from a remote location. One way to establish a secure connection may be by using session keys, as described above.

In step 1120, the RPS requests user ID information from the UMD in response to the request for the item. The user may be notified of the request via a display or some other user interface on the UMD, and may give consent via a user interface of the UMD to release some or all of the requested user ID information associated with the MIC. In step 1130, the UMD issues authorization of the release, based on the user's consent, to the RPS or the APS in different embodiments. In some embodiments, the authorization may take the form of a token, an electronic document, a digital file, or the like issued from the UMD to the RPS and then submitted by the RPS to the APS seeking verification of the token, electronic document, digital file, or the like via the secure network. In some other embodiments, the authorization may be a direct request from the RPS to the APS or a token sent from the UMD to the APS to be matched with another token sent from the RPS to the APS.

In step 1140, the RPS receives the released user ID information which is verified as being trusted user ID information. In different embodiments, the APS may receive the authorization from the UMD (e.g., direct request in FIG. 7 or token in FIG. 8) or examine the authorization from the RPS (e.g., electronic documents in FIGS. 5 and 6 or token in FIG. 8) for verification or nonverification. When the authorization is verified, it establishes that the user ID information received by the RPS is valid and can be trusted. In some embodiments, the RPS may receive and use a public key or some other electronic document or digital file to verify that the user ID information received from the UMD is trustworthy.

Next, the RPS uses the trusted user ID information, which may be received from the UMD or the APS, to verify the identity of the user who requests the item using the UMD in step 1150. In some cases, the verification involves matching the user's name. In other cases, more may be required to satisfy the RPS. For instance, the verification may involve matching other biographic and/or biometric information and/or additional information. What is required may depend on the nature of the item requested. For an in-person transaction, any biographic or biometric information can be obtained live from the person at the RPS using biometric devices or readers (e.g., fingerprint matching or recognition by a fingerprint reader, iris or retina matching or recognition by iris or retina scanner, facial matching or recognition by a facial imaging device, voice matching or recognition by a voice recording device, etc.). For an online transaction, such information can be obtained from a trusted source and/or a liveness check can be required to obtain the biometric information. If the identity of the user is not verified, the RPS may request resubmission of the user ID information from the UMD.

In step 1160, when the request from the UMD is verified to the satisfaction of the RPS, the RPS provides the requested item to the UMD in exchange for payment or another item that the user has agreed to provide to the RPS. For a limited quantity item, however, the RPS further checks the transaction records 133 before releasing the item so as not to exceed the limit. In step 1170, for a limited quantity item, the RPS updates the transaction records 133 to reflect the quantity of the item associated with the user ID from the latest transaction.

In general, a transaction involves a first party using a first party system and a second party using a second party system whereby the first party agrees to transfer a first item to the second party and the second party agrees to transfer a second item to the first party. For the transfer of the second item from the second party to the first party, the first party system plays the role of the UMD and the second party system plays the role of the RPS in FIG. 11. For the transfer of the first item from the first party to the second party, the second party system plays the role of the UMD and the first party system plays the role of the RPS in FIG. 11. In a simpler embodiment, an item being transferred is cash or cash-equivalent and the transfer does not require proof of identity and the process described in FIG. 11 does not apply. If the item being transferred is a non-cash payment, the process of FIG. 11 applies if proof of identity is required; otherwise, existing payment processes can be used instead.

Figure 12:
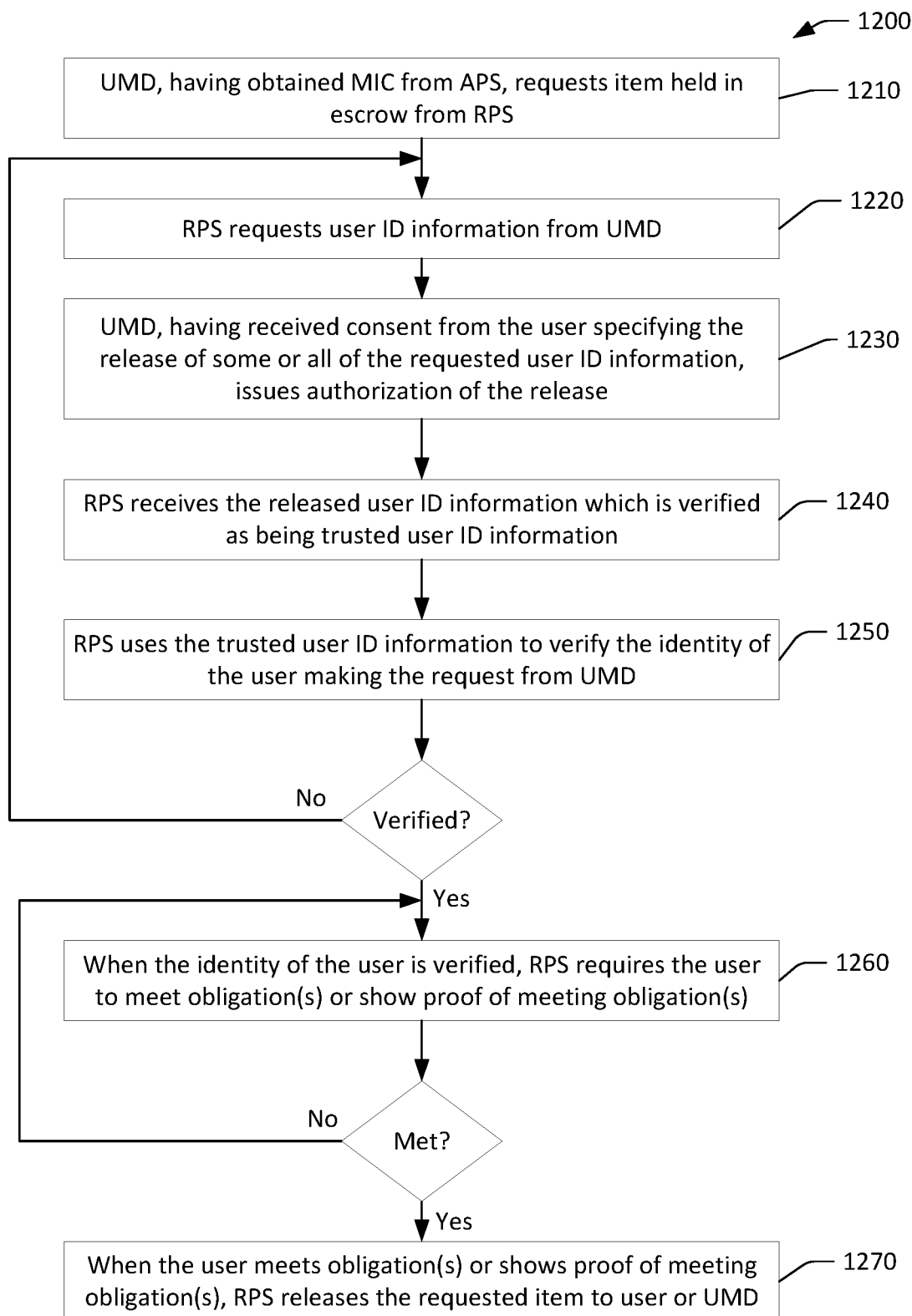
FIG. 12 is a flow diagram illustrating an embodiment of a process for a party involved in escrow to request the release of an item held in escrow.

FIG. 12 is a flow diagram 1200 illustrating an embodiment of a process for a party involved in escrow to request the release of an item held in escrow. In step 1210, a party involved in escrow (user via UMD) seeks release of an item held in escrow from the RPS (escrow provider's system). In step 1220, the RPS requests user ID information from the UMD in response to the request for the item. The user may be notified of the request via a display or some other user interface on the UMD and may give consent to release some or all of the requested user ID information associated with the MIC via a user interface of the UMD. In step 1230, the UMD may issue authorization of the release, based on the user's consent, to the RPS or the APS in different embodiments. In some embodiments, the authorization may take the form of a token, an electronic document, a digital file, or the like issued from the UMD to the RPS and then submitted by the RPS to the APS seeking verification of the token, electronic document, digital file, or the like via the secure network. In some other embodiments, the authorization may be a direct request or a token sent from the UMD to the APS.

In step 1240, the RPS receives the released user ID information which is verified as being trusted user ID information. In different embodiments, the APS may receive the authorization from the UMD (e.g., direct request in FIG. 7 or token in FIG. 8) or examine the authorization from the RPS (e.g., electronic documents in FIGS. 5 and 6 or token in FIG. 8) for verification or nonverification. When the authorization is verified, it establishes that the user ID information received by the RPS is valid and can be trusted. In some embodiments, the RPS may receive and use a public key or some other electronic document or digital file to verify that the user ID information received from the UMD is trustworthy.

Next, the RPS uses the trusted user ID information, which may be received from the UMD or the APS, to verify the request for the item from the UMD in step 1250. In some cases, the verification involves matching the user's name and age. In other cases, more may be required to satisfy the RPS. For instance, the verification may involve matching other biographic and/or biometric information and/or additional information. What is required may depend on the nature of the item requested. If the identity of the user is not verified, the RPS requests resubmission of the user ID information from the UMD.

In step 1260, when the request from the UMD is verified to the satisfaction of the RPS, the RPS requires the user, via the escrow provider system, to meet the obligation(s) specified in the escrow agreement before releasing the requested item. This may be done when an escrow provider system receives from the UMD part or all of the user's escrow fulfillment information associated with an escrow MIC which the UMD received from an escrow APS, which is the first MIC issued by the first APS or another MIC issued by another APS, and the user has consented to release the part or all of the user's escrow fulfillment information to the escrow provider system, and the part or all of first party escrow fulfillment information has been verified. This escrow scenario for verifying escrow fulfillment is analogous to the scenario described above in connection with FIGS. 1-10, in which the escrow provider system plays the role of the RPS and the escrow APS plays the role of the APS. Instead of or in additional to verifying the identity of the user of the UMD, the escrow provider system as the RPS requires the user to provide verified escrow fulfillment information showing that the user has met the escrow obligation(s) required in order to release the item requested by the user via the UMD.

If the escrow obligation(s) is/are not met, the RPS or the escrow provider system requires the user to meet the obligation(s) by notification via the UMD. In step 1270, when the user meets the escrow obligation(s), for instance, by placing another item in escrow or shows proof of meeting the obligation(s), the RPS releases the requested item held in escrow to the user (by physical transfer or shipment of item held in escrow) or the UMD (by digital transfer or download of digital content or other information 134 held in escrow). Examples of items held in escrow or to be placed in escrow include money (physical or digital), legal documents such as titles, financial instruments, digital content, and other items of value.

The inventive concepts taught by way of the examples discussed above are amenable to modification, rearrangement, and embodiment in several ways. For example, while the above describes the use of token, public key, electronic document, digital file, and the like in verifying an authorization, a digital signature, and the like, other ways of authentication, authorization, and non-repudiation of business-related and other transactions can be used. For example, U.S. Patent Application Publication 2012/0089519 discloses transaction-level security system and method using shared keys and single use transaction signatures (SUTS). The description of the system of FIG. 1 in [0026]-[0038] and of the method of FIG. 6 in [0039]-[0046] are incorporated herein by reference. Accordingly, although the present disclosure has been described with reference to specific embodiments and examples, persons skilled in the art will recognize that changes may be made in form and detail without departing from the spirit and scope of the disclosure.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A method, for a transaction between a first party using a first party system and a second party using a second party system whereby the first party agrees to transfer a first item to the second party and the second party agrees to transfer a second item to the first party, comprising:
   receiving, by the second party system from the first party system, a request for transfer of the second item of the transaction to the first party system;
   sending, by the second party system to the first party system, a request for identification information of the first party;
   receiving, by the second party system, part or all of first party information associated with a first mobile identification credential (MIC) which the first party system received from a first authorizing party system (APS), the first party having consented to release the part or all of first party information to the second party system, and the part or all of first party information having been verified by the first APS before the second party system sends the request for identification information of the first party to the first party system;
   using, by the second party system, the verified part or all of first party information associated with the first MIC to verify or not verify an identity of the first party;
   verifying the identity of the first party before granting the request, by the second party system, to transfer the second item to the first party in exchange for transferring the first item from the first party to the second party.

2. The method of claim 1, wherein receiving the verified part or all of first party information comprises:
   receiving, by the second party system from the first party system, a token specifying the part or all of first party information which the first party has consented to release to the second party system;
   sending, by the second party system to the first APS, the received token, which is to be verified by the first APS with another token sent from the first party system to the first APS;
   when the tokens are received by the first APS within a preset timeframe and are verified by the first APS, receiving, by the second party system from the first APS, the verified part or all of first party information; and
   when the tokens are not received by the first APS within the preset timeframe or are not verified by the first APS, receiving, by the second party system from the first APS, a notification to resubmit the request for identification information of the first party.

3. The method of claim 1, wherein receiving the verified part or all of first party information comprises:
   receiving, by the second party system from the first party system, an electronic document specifying the part or all of first party information which the first party has consented to release to the second party system;
   sending, by the second party system to the first APS, the received electronic document;
   when the received electronic document is verified by the first APS, receiving, by the second party system from the first APS, the verified part or all of first party information; and
   when the received electronic document is not verified by the first APS, receiving, from the second party system from the first APS, a notification to resubmit the request for identification information of the first party.

4. The method of claim 1, wherein receiving the verified part or all of first party information comprises:
   receiving, by the second party system from the first party system, an electronic document and the part or all of first party information which the first party has consented to release to the second party system;
   sending, by the second party system to the first APS, the received electronic document;
   when the received electronic document is verified by the first APS, receiving, by the second party system from the first APS, an authentication key to verify the part or all of first party information received from the first party system; and
   when the received electronic document is not verified by the first APS, receiving, by the second party system from the first APS, a notification to resubmit the request for identification information of the first party.

5. The method of claim 1, wherein receiving the verified part or all of first party information comprises:
   receiving, by the second party system from the first party system, the part or all of first party information which the first party has consented to release to the second party system; and
   receiving, by the second party system from the first APS, an authentication key to verify the part or all of first party information received from the first party system, based on a request sent from the first party system to the first APS.

6. The method of claim 1, wherein the request for transfer of the second item is received by the second party system via an escrow provider system, the method further comprising:
   sending, by the second party system to the escrow provider system, a request for information showing that the first party has met escrow obligations to receive the second item;
   receiving, by the second party system, part or all of first party escrow fulfillment information associated with an escrow MIC which the first party system received from an escrow APS, which is the first MIC issued by the first APS or another MIC issued by another APS, wherein the first party has consented to release the part or all of first party escrow fulfillment information to the second party system, and wherein the part or all of first party escrow fulfillment information has been verified by the escrow APS before the second party system sends the request for information showing that the first party has met the escrow obligations to the escrow provider system;

using, by the second party system, the verified part or all of first party escrow fulfillment information to verify or not verify escrow fulfillment of the first party;

granting the request, by the second party system to the escrow provider system, to transfer the second item to the first party when the identity of the first party is verified and the escrow fulfillment of the first party is verified; and denying the request, by the second party system to the escrow provider system, to transfer the second item when at least one of the identity of the first party or the escrow fulfillment of the first party is not verified.

7. The method of claim 1, further comprising:

sending, by the second party system to the first party system, a request for transfer of the first item of the transaction to the second party system;

receiving, by the second party system from the first party system, a request for identification information of the second party;

sending, by the second party system, part or all of second party information associated with a second MIC which the second party system received from the first APS or a second APS, wherein the second party has consented to release the part or all of second party information to the first party system, wherein the part or all of second party information has been verified, and wherein the verified part or all of second party information is used to verify or not verify an identity of the second party;

receiving a grant of the request, by the second party system from the first party, to transfer the first item to the second party in exchange for transferring the second item from the second party to the first party, when the identity of the second party is verified; and receiving a denial of the request, by the second party system from the first party, to transfer the first item to the second party in exchange for transferring the second item from the second party to the first party, when the identity of the first party is not verified.

8. The method of claim 1, further comprising:

sending, by the second party system to the first party system, a request for a liveness check;

receiving, (i) by the second party system from the first party, liveness check information and evaluating the liveness check information to determine whether the liveness check is valid or invalid, or (ii) by the second party system from the first APS which has evaluated liveness check information received from the first party, a determination by the first APS as to whether the liveness check is valid or invalid;

granting the request from the first party, by the second party system, to transfer the second item to the first party when the identity of the first party is verified and when the liveness check is valid; and denying the request, by the second party system to the first party, to transfer the second item when the identity of the first party is not verified or when the liveness check is invalid.

9. The method of claim 1, wherein the second item is subject to a quantity limit, the method further comprising:

granting the request from the first party, by the second party system, to transfer the second item to the first party when the identity of the first party is verified and when an accumulated number of the second item transferred to the first party does not exceed the quantity limit; and denying the request, by the second party system to the first party, to transfer the second item when the identity of the first party is not verified or when the accumulated number of the second item transferred to the first party exceeds the quantity limit.

10. The method of claim 1, wherein the first APS is a separate system from the first party system and the second party system.

11. For a transaction between a first party using a first party system and a second party using a second party system whereby the first party agrees to transfer a first item to the second party and the second party agrees to transfer a second item to the first party, the second party system comprising a computer programmed to:

receive, from the first party system, a request for transfer of the second item of the transaction to the first party system;

send, to the first party system, a request for identification information of the first party;

receive part or all of first party information associated with a first mobile identification credential (MIC) which the first party system received from a first authorizing party system (APS), the first party having consented to release the part or all of first party information to the second party system, and the part or all of first party information having been verified by the first APS before the second party system sends the request for identification information of the first party to the first party system;

use the verified part or all of first party information associated with the first MIC to verify or not verify an identity of the first party;

verify the identity of the first party before granting the request to transfer the second item to the first party in exchange for transferring the first item from the first party to the second party.

12. The second party system of claim 11, wherein receiving the verified part or all of first party information comprises:

receiving, by the second party system from the first party system, a token specifying the part or all of first party information which the first party has consented to release to the second party system;

sending, by the second party system to the first APS, the received token, which is to be verified by the first APS with another token sent from the first party system to the first APS;

when the tokens are received by the first APS within a preset timeframe and are verified by the first APS, receiving, by the second party system from the first APS, the verified part or all of first party information; and when the tokens are not received by the first APS within the preset timeframe or are not verified by the first APS, receiving, by the second party system from the first APS, a notification to resubmit the request for identification information of the first party.

13. The second party system of claim 11, wherein receiving the verified part or all of first party information comprises:

receiving, by the second party system from the first party system, an electronic document specifying the part or all of first party information which the first party has consented to release to the second party system;

sending, by the second party system to the first APS, the received electronic document;

when the received electronic document is verified by the first APS, receiving, by the second party system from the first APS, the verified part or all of first party information; and when the received electronic document is not verified by the first APS, receiving, from the second party system from the first APS, a notification to resubmit the request for identification information of the first party.

14. The second party system of claim 11, wherein receiving the verified part or all of first party information comprises:

receiving, by the second party system from the first party system, an electronic document and the part or all of first party information which the first party has consented to release to the second party system;

sending, by the second party system to the first APS, the received electronic document;

when the received electronic document is verified by the first APS, receiving, by the second party system from the first APS, an authentication key to verify the part or all of first party information received from the first party system; and when the received electronic document is not verified by the first APS, receiving, by the second party system from the first APS, a notification to resubmit the request for identification information of the first party.

15. The second party system of claim 11, wherein receiving the verified part or all of first party information comprises:

receiving, by the second party system from the first party system, the part or all of first party information which the first party has consented to release to the second party system; and receiving, by the second party system from the first APS, an authentication key to verify the part or all of first party information received from the first party system, based on a request sent from the first party system to the first APS.

16. The second party system of claim 11, wherein the request for transfer of the second item is received by the second party system via an escrow provider system, and wherein the computer is further programmed to:

send, to the escrow provider system, a request for information showing that the first party has met escrow obligations to receive the second item;

receiving part or all of first party escrow fulfillment information associated with an escrow MIC which the first party system received from an escrow APS, which is the first MIC issued by the first APS or another MIC issued by another APS, wherein the first party has consented to release the part or all of first party escrow fulfillment information to the escrow provider system, and wherein the part or all of first party escrow fulfillment information has been verified by the escrow APS before the second party system sends the request for information showing that the first party has met the escrow obligations to the escrow provider system;

use the verified part or all of first party escrow fulfillment information to verify or not verify escrow fulfillment of the first party;

grant the request, to the escrow provider system, to transfer the second item to the first party when the identity of the first party is verified and the escrow fulfillment of the first party is verified; and deny the request, to the escrow provider system, to transfer the second item when at least one of the identity of the first party or the escrow fulfillment of the first party is not verified.

17. The second party system of claim 11, wherein the computer is programmed to:

send, to the first party system, a request for transfer of the first item of the transaction to the second party system;

receive, from the first party system, a request for identification information of the second party;

send part or all of second party information associated with a second MIC which the second party system received from the first APS or a second APS, wherein the second party has consented to release the part or all of second party information to the first party system, wherein the part or all of second party information has been verified, and wherein the verified part or all of second party information is used to verify or not verify an identity of the second party;

receive a grant of the request, by the second party system from the first party, to transfer the first item to the second party in exchange for transferring the second item from the second party to the first party, when the identity of the second party is verified; and receive a denial of the request, by the second party system from the first party, to transfer the first item to the second party in exchange for transferring the second item from the second party to the first party, when the identity of the first party is not verified.

18. The second party system of claim 11, wherein the computer is programmed to:

send, to the first party system, a request for a liveness check;

receive, (i) from the first party, liveness check information and evaluating the liveness check information to determine whether the liveness check is valid or invalid, or (ii) from the first APS which has evaluated liveness check information received from the first party, a determination by the first APS as to whether the liveness check is valid or invalid;

grant the request from the first party, by the second party system, to transfer the second item to the first party when the identity of the first party is verified and when the liveness check is valid; and deny the request, by the second party system to the first party, to transfer the second item when the identity of the first party is not verified or when the liveness check is invalid.

19. The second party system of claim 11,
wherein the first APS is a separate system from the first party system and the second party system.

20. A method, for a transaction between a first party using a first party system and a second party using a second party system whereby the first party agrees to transfer a first item to the second party and the second party agrees to transfer a second item to the first party, via an escrow provider using an escrow provider system, comprising:

receiving, by the escrow provider system from the first party system, a request for transfer of the second item of the transaction to the first party system;

sending, by the escrow provider system to the first party system, a request for identification information of the first party;

receiving, by the escrow provider system, part or all of first party information associated with a first mobile identification credential (MIC) which the first party system received from a first authorizing party system (APS), the first party having consented to release the part or all of first party information to the escrow provider system, and the part or all of first party information having been verified by the first APS before the escrow provider system sends the request for identification information of the first party to the first party system;

using, by the escrow provider system, the verified part or all of first party information associated with the first MIC to verify or not verify an identity of the first party;

sending, by the escrow provider system to the first party, a request for information showing that the first party has met escrow obligations to receive the second item;

receiving, by the escrow provider system, part or all of first party escrow fulfillment information associated with an escrow MIC which the first party system received from an escrow APS, which is the first MIC issued by the first APS or another MIC issued by another APS, the first party having consented to release the part or all of first party escrow fulfillment information to the escrow provider system, and the part or all of first party escrow fulfillment information having been verified by the escrow APS before the second party system sends the request for information showing that the first party has met the escrow obligations to the escrow provider system;

using, by the escrow provider system, the verified part or all of first party escrow fulfillment information to verify or not verify escrow fulfillment of the first party;

verifying an identity of the first party and verifying the escrow fulfillment of the first party before granting the request, by the second party system to the escrow provider system, for transfer of the second item to the first party.

21. The method of claim 20, wherein receiving the verified part or all of first party escrow fulfillment information comprises:

receiving, by the escrow provider system from the first party system, a token specifying the part or all of first party escrow fulfillment information which the first party has consented to release to the escrow provider system;

sending, by the escrow provider system to the escrow APS, the received token, which is to be verified by the escrow APS with another token sent from the first party system to the escrow APS;

when the tokens are received by the escrow APS within a preset timeframe and are verified by the escrow APS, receiving, by the escrow provider system from the escrow APS, the verified part or all of first party escrow fulfillment information; and when the tokens are not received by the escrow APS within the preset timeframe or are not verified by the escrow APS, receiving, by the escrow provider system from the escrow APS, a notification to resubmit the request for identification information of the first party.

22. The method of claim 20, further comprising:

sending, by the escrow provider system to the first party system, a request for a liveness check;

receiving, (i) by the escrow provider system from the first party, liveness check information and evaluating the liveness check information to determine whether the liveness check is valid or invalid, or (ii) by the escrow provider system from the escrow APS which has evaluated liveness check information received from the first party, a determination by the escrow APS as to whether the liveness check is valid or invalid;

granting the request, by the second party system to the escrow provider system, for transfer of the second item to the first party when the identity of the first party is verified and the escrow fulfillment of the first party is verified and the liveness check is valid; and denying the request, by the second party system to the escrow provider system, for transfer of the second item when at least one of the identity of the first party or the escrow fulfillment of the first party is not verified or the liveness check is invalid.

23. The method of claim 20, wherein the first APS is a separate system from the first party system and the escrow provider system.

24. The method of claim 20, wherein the escrow APS is a separate system from the second party system and the escrow provider system.

25. A system for a transaction between a first party using a first party system and a second party using a second party system whereby the first party agrees to transfer a first item to the second party and the second party agrees to transfer a second item to the first party, the first party system including a first computer programmed to perform operations according to first instructions, the second party system including a second computer programmed to perform operations according to second instructions, the first party system having received from a first authorizing party system (APS) a first mobile identification credential (MIC), the first APS including an APS computer programmed to perform operations according to APS instructions, the first party system sending, to the second party system, a request for transfer of the second item of the transaction to the first party system;

the second party system sending, to the first party system, a request for identification information of the first party;

the first party system receiving, from the first party, consent to release part or all of first party information associated with the first MIC;

(i) the first party system sending, to the second party system, the consented part or all of first party information, and the first APS verifying the part or all of first party information associated with the first MIC before the second party system sends the request for identification information of the first party to the first party system or (ii) the first APS sending, to the second party system, the consented part or all of first party information as verified part or all of first party information associated with the first MIC which the first party system receives from the first APS before the second party system sends the request for identification information of the first party to the first party system;

the second party system using the verified part or all of first party information associated with the first MIC to verify or not verify an identity of the first party; and the identity of the first party being verified before the second party system grants the request to transfer the second item to the first party in exchange for transferring the first item from the first party to the second party.

26. The system of claim 25,
wherein the first APS is a separate system from the first party system and the second party system.

\* \* \* \* \*